(12) United States Patent
Biswas et al.

(10) Patent No.: US 9,152,803 B2
(45) Date of Patent: *Oct. 6, 2015

(54) OPTIMIZED POLICY MATCHING AND EVALUATION FOR HIERARCHICAL RESOURCES

(75) Inventors: Kamalendu Biswas, San Ramon, CA (US); Andrei Kapishnikov, Waltham, MA (US); Sastry Hari, San Jose, CA (US)

(73) Assignee: ORACLE INTERNATIONAL INCORPORATED, Redwood Shores, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/454,771

(22) Filed: Apr. 24, 2012

(65) Prior Publication Data

US 2013/0283339 A1   Oct. 24, 2013

(51) Int. Cl.
G06F 17/00 (2006.01)
H04L 29/06 (2006.01)
G06F 21/60 (2013.01)

(52) U.S. Cl.
CPC ...... *G06F 21/604* (2013.01); *G06F 2221/2141* (2013.01); *G06F 2221/2145* (2013.01)

(58) Field of Classification Search
CPC .......... G06F 21/604; G06F 2221/2145; G06F 2221/2141
See application file for complete search history.

(56) References Cited

U.S. PATENT DOCUMENTS

| 6,917,975 B2 | 7/2005 | Griffin et al. |
| 2006/0236369 A1 | 10/2006 | Covington et al. |
| 2008/0083014 A1* | 4/2008 | Lim .................................. 726/1 |
| 2009/0106433 A1* | 4/2009 | Knouse et al. ................ 709/229 |
| 2010/0095018 A1 | 4/2010 | Khemani et al. |
| 2011/0247046 A1* | 10/2011 | Gross et al. ....................... 726/1 |
| 2012/0016907 A1 | 1/2012 | Ikeda et al. |

OTHER PUBLICATIONS

Biswas et al., U.S. Appl. No. 13/454,834, filed Apr. 24, 2012.
Dettelback et al., "Oracle Entitlements Server", An Oracle White Paper, Sep. 2008, 14 pages.
Oasis, "Oasis eXtensible Access Control Markup Language (XACML) TC", dowloaded from https://www.oasis-open.org/committees/tc_home.php?wg_abbrev=xacml on Sep. 6, 2012, 9 pages.
Oasis, "XACML v3.0 Core and Hierarchical Role Based Access Control (RBAC) Profile Version 1.0", Committee Specification 01, Aug. 10, 2010, 25 pages.
Oasis, "A Brief Introduction to XACML", Last updated Mar. 14, 2003, downloaded from https://www.oasis-open.org/committees/download.php/2713/Brief)Introduction_to_XACML . . . . On Sep. 6, 2012, 3 pages.
Oasis, "XACML v3.0 Hierarchical Resource Profile Version 1.0", Committee Specification 01, Aug. 10, 2010, 23 pages.

(Continued)

*Primary Examiner* — Andrew Nalven
*Assistant Examiner* — Quy Pham
(74) *Attorney, Agent, or Firm* — Kilpatrick Townsend & Stockton LLP

(57) ABSTRACT

Improved techniques are provided for processing authorization requests. In some embodiments, an authorization request specifying a hierarchical resource can be processed without having to sequentially process the various security policies configured for a collection of resources.

20 Claims, 19 Drawing Sheets

(56) References Cited

OTHER PUBLICATIONS

Oasis, "Miltiple Resource Profile of XACML v2.0", Oasis Standard, Feb. 1, 2005, 14 pages.
Oasis, "Hierarchical Resouse Profile of XACML v2.0", Oasis Standard, Feb. 1, 2005, 18 pages.
Oasis, eXtensible Access Control Markup Language (XACML) Version 3.0, Committee Specification 01, Aug. 10, 2010, 150 pages.
Oasis, "eXtensible Access Control Markup Language (XACML) Version 2.0", Oasis Standard, Feb. 1, 2005, 141 pages.
Oasis, "Core and Hierarchical Role Base Access Control (RBAC) Profile of XACML v2.0", Oasis Standard, Feb. 1, 2005, 23 pages.
Non-Final Office Action dated Aug. 15, 2014, issued in U.S. Appl. No. 13/454,834.
Final Office Action dated Mar. 13, 2015, issued in U.S. Appl. No. 13/454,834.

* cited by examiner

"/A/C/E/H"

"/A/C/E/H", /A/C/D/F"

"/A/C/.*"

"/A/C/.*", "/A/C/D/.*"

"a.*"

"a.*", "ab.*"

"a.*", "ab.*"                "bc.*"

".*bd.*"

".*bd.*", ".*bc.*"

OPTIMIZED POLICY MATCHING AND EVALUATION FOR HIERARCHICAL RESOURCES

CROSS-REFERENCES TO RELATED APPLICATIONS

This application incorporates by reference for all purposes the entire contents of U.S. Non-Provisional application Ser. No. 13/454,834 entitled OPTIMIZED POLICY MATCHING AND EVALUATION FOR NON-HIERARCHICAL RESOURCES, filed on the same day as the present application.

BACKGROUND

Embodiments of the present invention relate to authorization systems, and more particularly to techniques that enable authorization of requests to access resources to be handled in an efficient manner.

Sensitive information requires careful and effective access control that governs who can access the information. For example, in a large enterprise, information related to the enterprise (e.g., business information) needs to be protected from unauthorized access. In such an enterprise, an authorization system is generally used to regulate access to the enterprise's information. A set of security policies is generally configured for the enterprise and the authorization system uses these configured policies to control access to the information. The set of security policies may, for example, be configured by an enterprise system administrator or a data security administrator.

In an environment where access is controlled by an authorization system, the various entities or objects that can be accessed are usually modeled in the form of resources. For example, in an enterprise environment, resources may include documents storing business information, subparts of a document (e.g., a paragraph within a document), one or more websites (e.g., a business website), one or more web pages stored by the sites, and the like. The authorization system controls access to these resources based upon one or more security policies configured for the environment. In a typical setup, all access or authorization requests to access one or more of the resources are intercepted by the authorization system and have to be authorized by the authorization system before access to the requested resource can be granted. The authorization system performs authorization, which is the process of determining if a user identified in the authorization request has a right to (or is allowed to) access a requested resource. The user is allowed to access the resource only if successfully authorized by the authorization system.

In a typical business or enterprise environment, the number of resources is usually very large. Likewise, the number of security policies for controlling access to these resources is also very large. Further, the number of users wanting to access the resources is also typically very large. As a result, the authorization system generally receives and has to process a large number of resource access requests, which may be received serially or even concurrently. Due to a combination of the very large number of resources, a large number of policies, and a large number of users, the authorization-related processing performed by an authorization system is complicated and requires a lot of computing resources (e.g., processing resources such as CPU usage, memory resources) and consequently is time consuming. For example, for each authorization request, the authorization system has to process all the security policies to determine whether or not a user identified in the access request is allowed to access the requested resource. Existing authorization systems cannot keep up with the growing number of resources, security policies, and users, and are not scalable.

BRIEF SUMMARY

Certain embodiments of the present invention provide improved techniques for processing authorization requests. In one embodiment, an authorization request can be processed without having to sequentially process the various security policies configured for a collection of resources.

In some embodiments, techniques are provided for performing authorization of requests to access resources, including hierarchical and non-hierarchical resources. These techniques enable processing of authorization requests to be performed in an improved and efficient manner, including providing an efficient technique for identifying polices that are applicable for authorizing an authorization request. In one embodiment, this is achieved by determining the applicable policies without having to process all the policies in response to receiving an authorization request. The identified one or more applicable security policies may then be evaluated to compute a success or failure decision for the authorization request. Due to the optimized and improved techniques, the overall authorization-related processing time is reduced compared to conventional techniques. Embodiments thus improve system throughput by optimizing system utilization while also reducing the authorization decision evaluation latency.

In some embodiments, a set of memory structures are built and stored for policies configured for an enterprise system. The plurality of memory structures may comprise a first set of memory structures corresponding to a first resource type (e.g., hierarchical resource type) and a second set of memory structures corresponding to a second resource type (e.g., non-hierarchical resource type). Upon receiving an authorization request, the resource type for the authorization request is determined. Memory structures corresponding to the determined resource type are then used to identify a set of policies that are applicable for authorizing the authorization request. The set of policies may then be evaluated for the authorization of the authorization request.

In some embodiments, the processing performed to identify the set of applicable policies for an authorization request is a function of the number of components in the resource expression included in the authorization request, but is independent of the total number of policies or the total number of resources. For example, for a resource expression in the authorization request identifying a hierarchical resource, the processing may be dependent upon the number of path components in the resource expression. For a resource expression in the authorization request identifying a non-hierarchical resource, the processing may be dependent upon the number of characters in the resource expression identifying the non-hierarchical resource. Since the number of components (e.g., path components for hierarchical resources, characters for non-hierarchical resources) in an authorization request resource expression is typically far less (generally several orders of magnitude less) than the number of policies configured for the enterprise system or the number of resources in the enterprise system, this greatly reduces the amount of processing resources used and time needed for identifying one or more policies that are applicable to the authorization request than conventional techniques.

In some embodiments, the determined applicable policies may be further filtered based upon other criteria such as the subject specified by the authorization request, the action specified by the authorization request, and other information specified by the authorization request. The filtered set of policies may then be evaluated for authorizing the authorization request.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention embodiments may be practiced without these specific details.

Certain embodiments of the present invention provide improved techniques for performing authorization of requests to access resources. In one embodiment, techniques are provided that enable processing of authorization requests to be performed in an improved and efficient manner. Techniques are provided that enable security policies that are applicable for an authorization request to be identified in an optimal manner. In one embodiment, this is achieved by determining the applicable policies without having to process all the policies in response to receiving an authorization request. The identified one or more applicable security policies may then be evaluated to compute a success or failure decision for the authorization request. Due to the optimized and improved techniques, the overall authorization-related processing time is reduced compared to conventional techniques. Embodiments thus improve system throughput by optimizing system utilization while also reducing the authorization decision evaluation latency.

Figure 1:
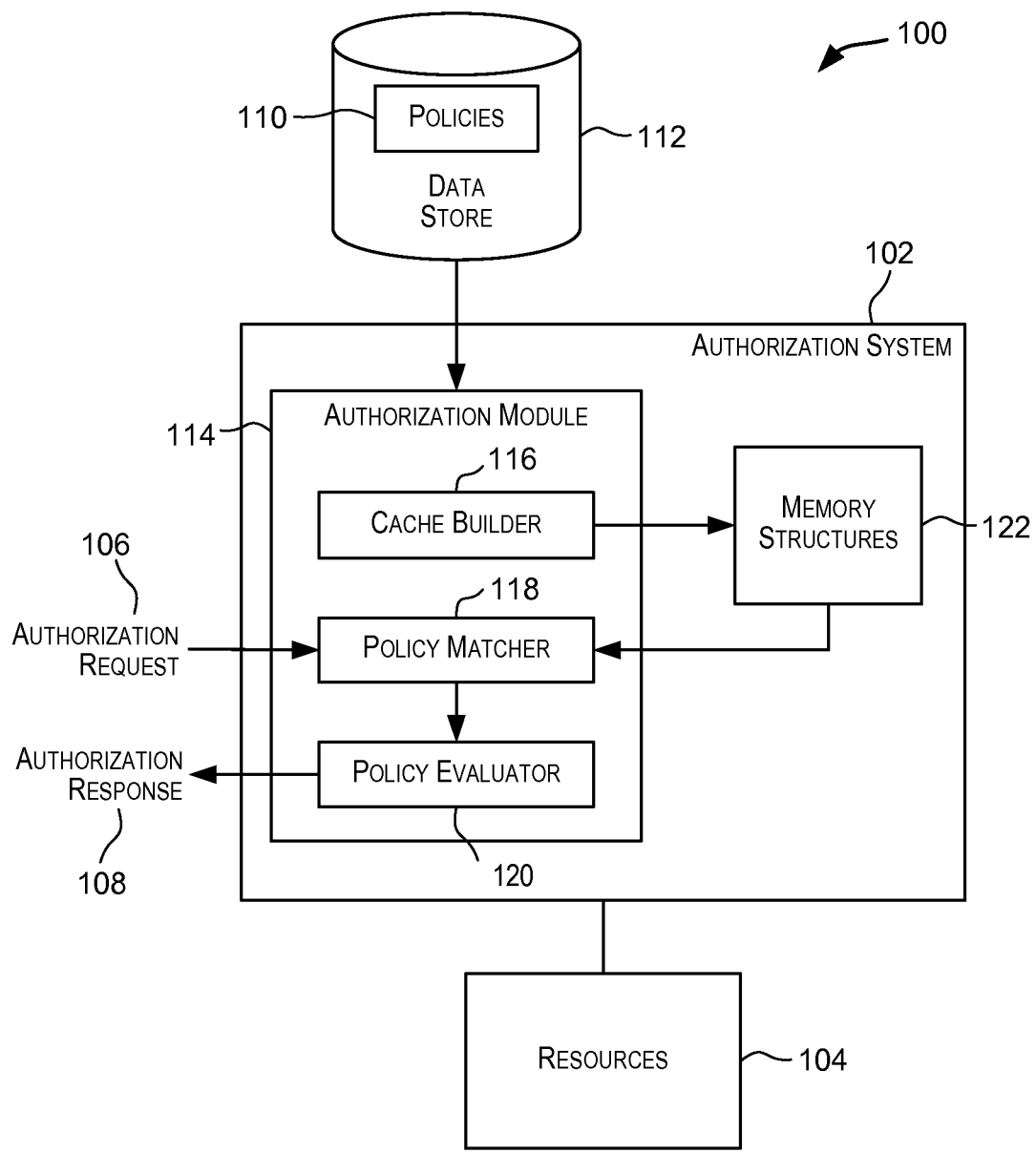
FIG. 1 depicts a simplified diagram of a system that may incorporate an authorization system according to an embodiment of the present invention.

FIG. 1 depicts a simplified diagram of a system 100 that may incorporate an embodiment of the present invention. System 100 may, for example, be part of an enterprise system. As shown in FIG. 1, system 100 comprises an authorization system 102 that is configured to control access to a set or collection of resources 104. System 100 depicted in FIG. 1 is merely an example of an embodiment incorporating the teachings of the present invention and is not intended to limit the scope of the invention.

Resources 104 may include resources of different types including but not limited to digital objects and physical objects. Resources may include, for example, documents storing business information, subparts of a document (e.g., a paragraph within a document), one or more websites (e.g., a business website), one or more web pages stored by the sites, pieces or blobs of information, a database or portions thereof, one or more applications, one or more files, computer resources such as systems, memories, monitors, printers, scanners, and the like.

In some embodiments, one or more resources 104 may be associated with one or more applications. The assignment or association of a resource with an application may be done by a system administrator or an application administrator. A resource associated with an application may be considered to be owned by the application. An application can own one or more resources. In one embodiment, an application is authorized to use only those resources that are owned by the application. For example, a portal application may comprise multiple web pages, which are associated with the portal application. These web pages represent resources owned by the portal application. In some embodiments, resources are not shared between applications, i.e., a resource is assigned to and owned by only one application. In other embodiments, a resource may be assigned to and owned by multiple applications and may thus be shared between the multiple applications. For example, a document storing user credit rating information may be shared between an insurance application and a mortgage application.

In the embodiment depicted in FIG. 1, authorization system 102 is configured to control access to resources 104. As part of controlling access to the resources, authorization system 102 is configured to receive one or more authorization requests 106, each authorization request typically identifying a requester (also referred to as a subject), a resource (or multiple resources), and an action that the subject wants to perform using the resource. Upon receiving an authorization request, authorization system 102 is configured to perform authorization of the request, where authorization is the process of determining if a subject identified by an authorization request has a right to perform a requested action on a requested resource. Accordingly, as part of the authorization processing, authorization system 102 is configured to determine whether the subject identified in the authorization request is authorized to perform the action on the resource (or resources) identified in the request, and based upon the determination either grant or deny the subject access to the resource.

As indicated above, an authorization request 106 may identify a subject, a resource, and an action that the subject wishes to perform on the requested resource. The subject could be a user or a user in a particular role. The user could be a human user or a non-human user. The requested action may be of various types but not limited to view a resource, read a resource, edit a resource, print a resource, communicate a resource, delete a resource, and the like.

In addition to the subject, resource, and action information, an authorization request may optionally comprise contextual information related to the request. For example, as previously indicated, a resource may be owned by an application. In some embodiments, an authorization request 106 may identify an application whose resource is requested. In some other embodiments, the contextual information may comprise information identifying an environment in which the access is requested. Examples of environment may include but are not restricted to a time period, Intranet, Internet, an application domain, a network address of a computer (e.g., an IP address), and the like. In some embodiments, the environment may be implied from the source of the authorization request.

Accordingly, an authorization request may be represented as comprising:

Authorization Request=(Subject, Resource Info, Action(s), Contextual Information) where Resource Info= (Resource Type, Resource Expression)

The "Resource Expression" identifies the requested resource. The "Resource Type" identifies the type of the requested resource. Further information on resource types is provided below. Authorization system 102 uses the information included in the authorization request to authorize the request.

In some embodiments, the authorization processing performed by authorization server 102 results in one of the following outcomes:

(1) The authorization processing yields that the subject identified in the authorization request is allowed to perform the action identified by request on the resource identified by the authorization request. This is referred to as successful authorization and the subject is granted access to the requested resource.

(2) The authorization processing yields that the subject identified in the authorization request is not allowed to perform the requested action on the resource identified in the authorization request. This is referred to as failed authorization and the subject is not granted access to the requested resource.

(3) The authorization processing cannot determine whether or not the subject identified in the authorization request is allowed to perform the action identified by the request on the resource identified by the authorization request. This may happen, for example, when authorization system 102 is unable to determine any policy for performing authorization. In a majority of the instances, this is treated as a failed authorization and the subject is not allowed to perform the requested action on the requested resource.

In some embodiments, authorization server 102 may be configured to send a response 108 to the requesting entity indicating the success or failure of the authorization request. If authorization is successful, then authorization system 102 may send information to the subject enabling the subject to access the resource (e.g., the requested resource may be served to the subject). If authorization is unsuccessful, then one or more reasons for the failed authorization may be provided to the subject.

Authorization system 102 may receive an authorization request 106 from different sources. In some embodiments, authorization system 102 may receive an authorization request directly from the subject or may receive the request via a communication network. Authorization responses 108 indicating success or failure of the authorization may be communicated to the requesting entity either directly or via a communication network. The communication network may include networks of different types including the Internet, an Intranet, a local area network (LAN), a wide area network (WAN), an Ethernet network, or any communication network/infrastructure that enables communications to and from authorization system 102. The communication network may use different communication protocols including wired or wireless protocols.

In some embodiments, authorization system 102 is configured to perform authorization of authorization requests based upon a set of access or security policies 110 ("policies") configured for the enterprise. Authorization system 102 uses policies 110 to authorize authorization requests. Policies 110 may, for example, be configured by an administrator of the enterprise system. One or more policies may be configured for a resource. A policy may be configured for one or more resources. A set of one or more policies for a resource may be configured when the resource is provisioned or made available in the enterprise. In some embodiments, one or more resources may be grouped and policies configured for the group. In one embodiment, policies may be defined on a per application basis. In such an embodiment, access to resources assigned to an application may be regulated by authorization system 102 based upon the one or more policies configured for that application.

Policies information 110 may be stored in a data store 112 that is accessible to authorization system 102. In some embodiments, data store 112 may be remote from authorization system 102 and accessible to system 102 via a communication network. Data store 112 may be of different types. For example, in some embodiments, data store 112 may be a database.

In some embodiments, a policy may comprise target information and rules information and may be conceptually represented as:

Policy=(<Target Information>, <Rules Information>)

The target information specified by a policy identifies one or more conditions that determine when the policy is applicable and is to be selected for authorization. The rules information comprises one or more rules that are evaluated by authorization system 102 to determine whether the subject in the authorization request is allowed to perform the action indicated in the authorization request on the requested resource. The target information thus determines when a policy is selected for authorization processing. After a policy has been selected for authorization processing, the rules information is used to perform the authorization.

As indicated above, the target information for a policy identifies one or more conditions that determine when the policy is applicable and is to be selected for authorization. In some embodiments, the target information comprises information identifying a subject, a resource, and an action targeted by the policy. Target information may also optionally comprise other information such as environment information. Target information in a policy may conceptually be represented as:

Target Information=(Subject Info, Resource Info, Action Info, Environment Info)

For example, the target information for a policy P1 may be as follows:

P1: Target Info=(Subject=Joe; Resource=(Hierarchical, "/page/.*"), Action=View; Environment=9 am-5 pm)

The above example specifies that the policy P1 is to be selected and applied when the subject in the incoming authorization request is Joe, the action requested is "View", the resource on which the action is requested is a hierarchical resource and falls under "/page/.*", and the environment is "9 am-5 pm". The "/page/.*" is also referred to as a resource expression for the policy. The resource expression for a policy identifies the one or more resources to which the policy applies (i.e., the resources covered or targeted by the policy).

In some embodiments, the resource information specified by the target information in a policy may comprise:

Resource Information=(Resource Type, Resource Expression, Resource Attributes)

The "Resource Expression" identifies the one or more resources that are targeted by the policy. The "Resource Type" information indicates the type of the targeted resources. The "Resource Attributes" information is optional and identifies zero or more attributes of the targeted resources.

In some embodiments, multiple resource types may be defined for an enterprise. Resources in the enterprise may then be assigned to or associated with a resource type from the defined resource types. In some embodiments, a resource may be associated with a single resource type selected from the set of resource types configured for an enterprise system. In some embodiments, the resource type to be associated with a resource may be determined based upon one or more attributes of the resource. These attributes and the manner in which the attributes are used to determine a resource type for the resource may be user configurable. In some embodiments, a resource may be assigned to or associated with a resource type when the resource is provisioned or made available for use in the enterprise system. The association may, for example, be made by a system administrator. Information may be stored identifying resources and, for each resource, the resource type associated with that resource.

For example, in one embodiment, two resource types, namely, a hierarchical resource type and a non-hierarchical resource type may be defined for an enterprise and a resource in the enterprise may be associated with one of the two types. A resource tagged or associated with the hierarchical resource type may be referred to as a hierarchical resource. A resource tagged or associated with the non-hierarchical resource type may be referred to as a non-hierarchical resource.

Whether a resource is to be tagged as a hierarchical resource or a non-hierarchical resource may be determined based upon attributes of the resource. In one embodiment, a resource involved in a hierarchy-based relationship may be classified as a hierarchical resource (i.e., the resource assigned or associated with a hierarchical resource type). For example, in an enterprise, resources associated with a website may be hierarchically organized and these resources may be tagged as hierarchical resources.

Figure 4:
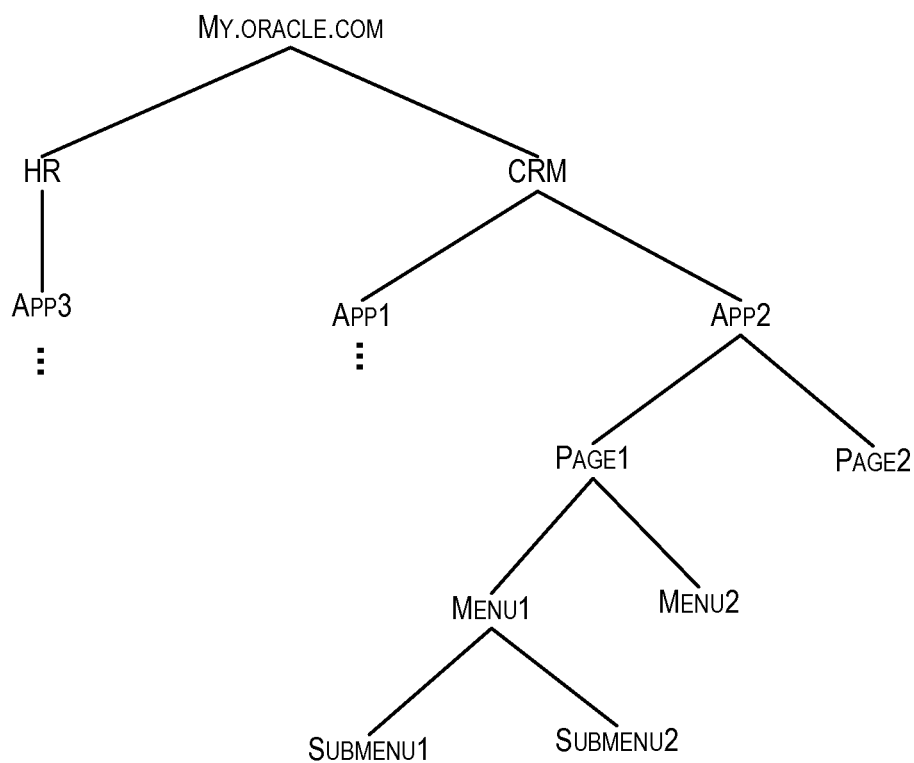
FIG. 4 shows an example of resources involved in a hierarchical relationship and tagged as hierarchical resource types according to an embodiment of the present invention.

FIG. 4 shows an example of resources involved in a hierarchical relationship and tagged as hierarchical resource types according to an embodiment of the present invention. As can be seen in FIG. 4, each resource is hierarchically related to at least one other resource and is thus tagged as a hierarchical resource type. As shown in FIG. 4, "my.oracle.com" may represent a top level website and lie at the top of the resource hierarchy. Accordingly, "my.oracle.com" may be considered a top level resource situated at the top of the resource hierarchy. The website may comprise resources related to Human Resources ("HR") and resources related to Customer Relationship Management ("CRM"). Accordingly, resources for "HR" and "CRM" may be considered as children or descendants of "my.oracle.com" in the resource hierarchy. Alternatively, "my.oracle.com" may be referred to as the parent or ancestor of the "HR" and "CRM" resources. The "HR" and CRM resources may in turn have one or more associated applications. As shown in FIG. 4, "HR" resource has a child application resource "App3" and the "CRM" resource has two child application resources "App1" and "App2". Application "App2" may comprise two web pages "Page1" and "Page2", which are child resources of application "App2". Resource "Page1" may comprise two submenus "Menu1" and "Menu 2", which are hierarchically children of "Page1". "Menu1" additionally has two child resources "Submenu1" and "Submenu2". Resources "App1" and "App3" may also have additional resources in hierarchical relationships (not shown). Resources "Submenu1", "Submenu2", "Menu 2", and "Page2", which lie at the bottom of the resource hierarchy, are referred to as leaf resources. The resource "my.oracle.com" is referred to as the root resource in the resource hierarchy. While FIG. 4 depicts one example of a resource hierarchy, it is not intended to be limiting. Various different resource hierarchies may be configured within an enterprise.

As indicated above, a resource that is included in a resource hierarchy may be tagged as a hierarchical resource type. In such an embodiment, a resource that is not involved in a hierarchical relationship may be associated with a non-hierarchical resource type. For example, a file that is not hierarchically related to any other resource may be associated with a non-hierarchical resource type tag.

The "Resource Expression" identifies an expression identifying the one or more resources that are targeted by the policy. Various different types of resource expressions may be used to identify the one or more targeted resources. Regular expression syntax (e.g., wildcards, etc.) may be used as part of the resource expression to identify one or more resources. For example, for a hierarchical resource, a hierarchical path or a portion thereof may be used to specify the targeted resource. The various components in the hierarchical path may be separated by delimiters. In some embodiments, a preconfigured set of characters may be used as delimiters to separate the components in a hierarchical path. Examples of these limiters include but are not restricted to "/", "\", ",", ":", and "$". Using the hierarchy depicted in FIG. 4 as an example, examples of resource expressions include "/my.oracle.com/CRM/App2/Page2", "/my.oracle.com/CRM/App2/.*", ".*/Page1/Menu2", ".*/Menu1/.*", etc.

Non-hierarchical resources are not involved in a hierarchical relationship. Examples of expressions for specifying targeted non-hierarchical resources include: "abcd", "abc.*", ".*de", ".*bc.*", etc.

Once a policy has been selected for authorization processing based upon the target information, the rules information configured for the policy defines conditions that are evaluated by authorization system 102 to determine whether the subject in the authorization request is allowed to perform the action indicated in the authorization request on the requested resource.

The rules information for a policy may comprise one or more rules. Accordingly, rules information for a policy may be represented as:

Rules Information=$(R_1, R_2, \ldots, R_N)$, where N is one or greater.

In some embodiments, for a selected policy, each rule specified in the rules information for that policy is evaluated. The evaluation of a rule returns a success or a failure result. The success or failure decision for a policy is then determined based upon the success or failure results for the one or more rules associated with the policy.

In some embodiments, a policy evaluation results in a successful (or grant) decision only if all the rules specified for the policy return a success result. In this embodiment, even if one rule of a policy returns a failure result, then the evaluation of the policy is also deemed to be a fail decision. In some other embodiments, the evaluation of the policy may indicate a success if one of the rules specified by the policy evaluates to a success. In yet other embodiments, different customized relations between the rules specified by the policy may be used to determine whether the policy evaluates to a success or a failure. The customized relationships may include for example, first applicable approach (policy evaluates to success upon the first successful evaluation of a rule specified by the policy), last applicable approach, etc. In some embodiments, how the rules evaluation affects the policy evaluation may be configured on a policy-by-policy basis.

In one embodiment, a rule may be expressed as follows:
Rule=(<Condition(s)>)
The conditions information for a rule may comprise information identifying one or more conditions that need to evaluate to true for the rule to evaluate to true. The conditions may be related to a subject, a resource, an action, an environment, attributes, etc. For example, a policy P1 may comprise target information and rules information as follows:

P1 =(<Subject=Joe; Resource=(Hierarchical, "/page/.*"), Action=View, <R1, R2 >)
R1 =(<Subject=Joe; Environment=1 pm-5 pm>), and
R2 =(<Subject=Joe; Environment=March>).

In this example, policy P1 is to be selected for evaluation in response to an authorization request when the subject in the authorization request is Joe, the requested action is "View", the resource on which the action is requested is a hierarchical resource and falls under "/page/.*". Once P1 is selected, as part of the authorization processing, rules R1 and R2 are evaluated. Rule R1 specifies that Joe is allowed to view the resource only if the subject in the incoming authorization request is Joe and the time is 1 pm to 5 pm. Rule R2 specifies that the access is to be granted only if the subject in the incoming authorization request is Joe and the month is March. Assuming that the policy is set up such that it evaluates to true only when all its rules evaluate to true, then policy P1 evaluates to true or success only if the subject in the authorization request is Joe, it is the month of March, and the time is 1 pm-5 pm.

Accordingly, a policy can be considered as an association between a set of one or more resources, a subject, an action, and a set of one or more rules related to the subject and action. The set of rules identify when the subject is authorized (or not authorized) to perform the action on the set of one or more resources. In one embodiment, each rule associated with a policy has to evaluate to TRUE (success) for the subject to be authorized to perform the action on a resource from the set of resources. In another embodiment, a subject may be authorized to perform the action on a resource from the set of resources if any one of the rules evaluates to TRUE. In yet other embodiments, a customized algorithm, based upon the rules of a policy, may be used to determine the evaluation outcome of the policy.

Referring back to FIG. 1, authorization system 102 may comprise a set of components that are configured to facilitate authorization-related processing. In the embodiment depicted in FIG. 1, authorization system 102 comprises an authorization module 114 that is configured to perform authorization-related processing. Authorization system 102 may use one or more memory structures 122 to perform the authorization-related processing. These memory structures 122 may be stored in one or more memories of authorization system 102 or one or more memories accessible to authorization system 102 during authorization-related processing. Authorization module 114 may in turn comprise multiple modules, such as, as depicted in FIG. 1, a cache builder module 116, a policy matcher module 118, and a policy evaluator module 120. The authorization-related processing performed by authorization module 114 and its sub-modules 116, 118, and 120 is described in more detail below. The various modules depicted in FIG. 1 may be implemented in software (e.g., code, program, etc.) that is executed by one or more processors of authorization system 102, in hardware, or combinations thereof. The software may be stored on a non-transitory computer readable storage medium.

It should be appreciated that authorization system 102 depicted in FIG. 1 may have other components than those depicted in FIG. 1. Further, the embodiment shown in FIG. 1 is only one example of a system that may incorporate an embodiment of the invention. In some other embodiments, authorization system 102 may have more or fewer components than shown in FIG. 1, may combine two or more components, or may have a different configuration or arrangement of components.

Figure 2:
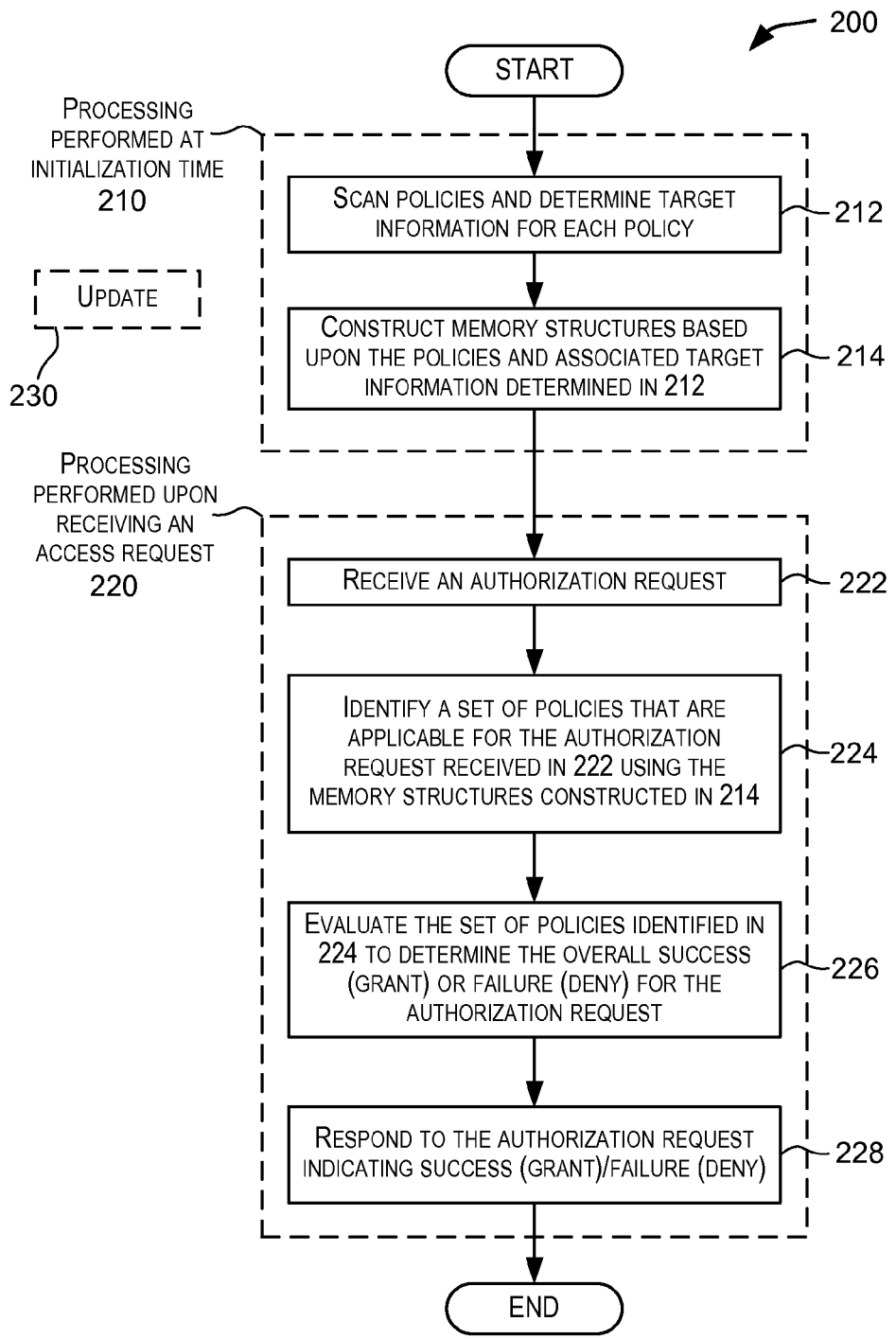
FIG. 2 depicts a simplified flowchart depicting processing performed by an authorization system according to an embodiment of the present invention.

FIG. 2 depicts a simplified flowchart 200 depicting processing performed by authorization system 102 according to an embodiment of the present invention. The processing depicted in FIG. 2 may be implemented in software (e.g., code, instructions, program) executed by one or more processors, hardware, or combinations thereof. The software may be stored on a non-transitory computer-readable storage medium. The particular series of processing steps depicted in FIG. 2 is not intended to limit the scope of embodiments of the present invention.

At a high level, in one embodiment, runtime authorization-related processing performed by authorization system 102 can be divided into three phases: (1) processing performed at initialization or system startup time (also sometimes referred to as "bootstrap" phase processing) (referenced by 210 in FIG. 2); (2) processing performed upon receiving an authorization request (also referred to as "authorization request processing" phase) (referenced by 220 in FIG. 2); and (3) processing performed for dynamically updating memory structures, etc., in response to changes in the authorization system (also referred to as "update" or "refresh" phase processing) (referenced by 230 in FIG. 2). Processing related to two or more of these three phases may be performed in parallel.

In the initialization or bootstrap phase, authorization system 102 is configured to read security or authorization polices 110 configured for a system (e.g., for an enterprise system), determine the resources that are the targets of the policies, and build data structures in memory to store information related to the policies such that the information can then be used for runtime processing of authorization requests. Accordingly, in some embodiments, at 212, authorization system 102 is configured to read policies configured for an enterprise system and determine the target information specified by the policies. As previously indicated, the target information for a policy identifies one or more subjects, resources, and actions targeted by the policy. A resource expression for a policy identifies the one or more resources that are covered by or targeted by that policy. For example, in 212, for each policy, authorization system 102 may read the target information, including reading the resource information in the target information. The processing in 212 may include determining, for each policy, a resource expression identifying one or more resources targeted by the policy, the type of the one or more resources, and one or more attributes, if any, associated with the one or more resources.

For example, a policy P1 may be read in 212 having target information
Target Info=(Subject=Joe; Resource Info=(H, /page/.*), Action=View; Environment=9 am-5 pm)
The resource expression for policy P1 is determined to be "/page/.*" and the targeted resources are hierarchical (denoted by "H"). As another example, a policy P2 may be read in 212 having targeted resources expressed as "/Dir_A/Folder_B/File_C" and the type of the resources is hierarchical. As yet another example, a policy P3 may be read in 212 having target information that indicates that the targeted resources is expressed as "expenses.doc" and the resource is a non-hierarchical resource. Accordingly, in 212, policies configured for controlling access to resources in an enterprise system are read, and for each policy, the target information specified by the policy is determined.

At 214, a set of memory structures for facilitating processing of authorization requests is then constructed and stored based upon the policies and associated target information determined in 212. The memory structures constructed in 214 may be stored in one or more memories of authorization system 102 or one or more memories accessible to authorization system 102 during authorization-related processing. In one embodiment, these memory structures are cached so that they can be easily accessed by authorization system 102 during runtime processing of authorization requests. For example, in some embodiments, the memory structures may be created and cached in runtime memory such as RAM associated with a processor(s) of authorization system 102. The memory structures may however also be stored in non-volatile memory such that they can be accessed and used during runtime processing of authorization requests. One or more memory structures may be constructed in 214. Further details related to processing performed in the startup or initialization phase are described below with respect to FIG. 3.

Processing performed in startup or initialization phase 210 results in generation of memory structures based upon one or more authorization policies configured for an enterprise system. These memory structures are then used by authorization system 102 to perform runtime processing of authorization requests in authorization request processing phase 220.

In the authorization request processing phase, at 222, authorization system 102 may receive one or more authorization requests. These requests may be received serially or in parallel. As previously described, an authorization request may comprise:
Authorization Request=(Subject, Resource Info, Action(s), Contextual Information)
where "Subject" identifies the subject requesting the authorization, "Resource Info" identifies a requested resource and the resource type of the requested resource, "Action" identifies an action that the subject desires to perform on the requested resource, and contextual information may provide a context in which the action is to be performed.

In response to receiving an authorization request in 222, at 224, authorization system 102 identifies a set of policies that are applicable for the received authorization request and that are to be evaluated to determine whether the authorization request is to be authorized or not. In some embodiments, the identification of the applicable policies in 224 is done using information included in the authorization request and information stored by the memory structures constructed in 214. By using the memory structures constructed in 214, authorization system 102 is able to identify the policies that are applicable for the received authorization request, from among the multiple policies defined for the enterprise system, without having to sequentially process each policy configured for the enterprise system. As a result, the processing performed for evaluating an authorization request is far less memory and processing resources intensive as compared to prior processing techniques, which sequentially processed all the policies configured for an enterprise system in response to an authorization request. As a result, some embodiments of the present invention use far less memory or processing resources for processing authorization requests than prior techniques. The overall time required for identifying applicable policies for an authorization request is also far less than that required for conventional sequential processing. As a result, the overall time required for processing an authorization request is greatly reduced when compared to conventional authorization requests processing.

The processing in 224 may yield zero or more policies as being applicable to the authorization request received in 222. If zero applicable policies are determined in 224, then in some embodiments, this is treated as failed authorization of the authorization request, and the subject identified in the authorization request is not allowed to perform the requested action on the requested resource and processing for the authorization request ends.

If one or more applicable policies are determined in 224, then at 226, each policy identified in 224 is evaluated, and the results of these evaluations used to determine the overall success (i.e., grant authorization) or failure (denial of authorization) of the authorization request. In some embodiments, a strict approach may be adopted, where each policy in the set of policies identified in 224 has to evaluate to TRUE or success for the authorization request to be authorized (i.e., successful authorization of the authorization request, in which case, the subject associated with the authorization request is allowed to perform the action associated with the authorization request on the resource associated with the authorization request in the context associated with the authorization request). In such embodiments, even if one policy from the set of policies identified in 224 evaluates to a FALSE or failure, then the overall authorization of the authorization request is deemed to be a failure (i.e., the subject associated with the authorization request is not allowed to perform the action associated with the authorization request on the resource associated with the authorization request in the context associated with the authorization request).

In some other embodiments, less strict approaches may be used with respect to policy evaluations. For example, in some embodiments, an authorization request may be successfully authorized even if all the applicable policies identified in 224 do not evaluate to TRUE (e.g., if any one of the applicable policies evaluates to true). Various customized "less strict" algorithms may be used for policy evaluation.

As previously described, a policy includes "Rules Information" that specifies one or more rules that are evaluated by authorization system 102 to determine whether the subject in the authorization request is allowed to perform the action indicated in the authorization request on the requested resource. Accordingly, in some embodiments, in 226, the evaluation of each applicable policy comprises evaluation of the one or more rules specified by that policy. In embodiments using a strict approach, each rule associated with a policy has to evaluate to TRUE (authorization granted) for the policy to be successfully (i.e., a grant result) evaluated. In another embodiment, a policy may evaluate to TRUE even if all the rules specified by the policy do not evaluate to TRUE (e.g., a policy may evaluate to TRUE if any one of the rules associated with the policy evaluates to TRUE).

At 228, authorization system 102 responds with the overall authorization result of the authorization processing performed for the authorization request received in 222. For example, information may be conveyed to the source of the authorization request received in 222 regarding the result of the authorization processing. If the authorization request is successfully authorized, then as part of the response sent in 228, information may be provided that enables the subject identified by the authorization request to perform the requested action on the requested resource. If the authorization is not successful, then a reason for the failed authorization may be provided in some embodiments.

In an enterprise environment, the policies configured for the enterprise environment may (and generally do) change dynamically over time to suit the enterprise's changing needs. Further, the resources that are controlled by the policies may also change dynamically. For example, new resources may be added, existing resources removed, relationships between resources may be changed (e.g., hierarchical relationships between the resources may be changed), and the like. The identities and roles of subjects, and the policies and rules may also dynamically change over time. These changes may occur during runtime processing performed by authorization system 102. In order to handle these dynamic changes, in some embodiments, an update phase 230 is provided during which processing is performed to determine the changes and keep the memory structures used by authorization system 102 to make authorization decisions updated. For example, as changes are made to one or more policies, authorization system 102 may scan these changed policies and dynamically update the memory structures that are constructed to represent or store information for the policies. Accordingly, the processing performed in 212 and 214 of the initialization phase may be repeatedly performed in update phase 230 for the changes. In some embodiments, processing related to update phase 230 may be performed at periodic intervals by authorization system 102. In some other embodiments, the processing in 230 may be triggered in response to certain changes made to the authorization system, for example, when a change to a policy is detected. In this manner, the information (e.g., memory structures built in 214) maintained by authorization system 102 for making authorization decisions is kept up-to-date to reflect any changes.

In some embodiments, the processing in 212 and 214 (and in 230) may be performed by cache builder module 116 depicted in FIG. 1. Cache builder module 116 may be configured to, at initialization or startup time of authorization system 102, read policies 110 stored in data store 112 and construct memory structures (e.g., caches) 122, which may be cached in runtime memory. Processing performed in 222 and 224 may be performed by policy matcher module 118 depicted in FIG. 1. Processing performed in 226 and 228 may be performed by policy evaluator module 120 depicted in FIG. 1.

Figure 3:
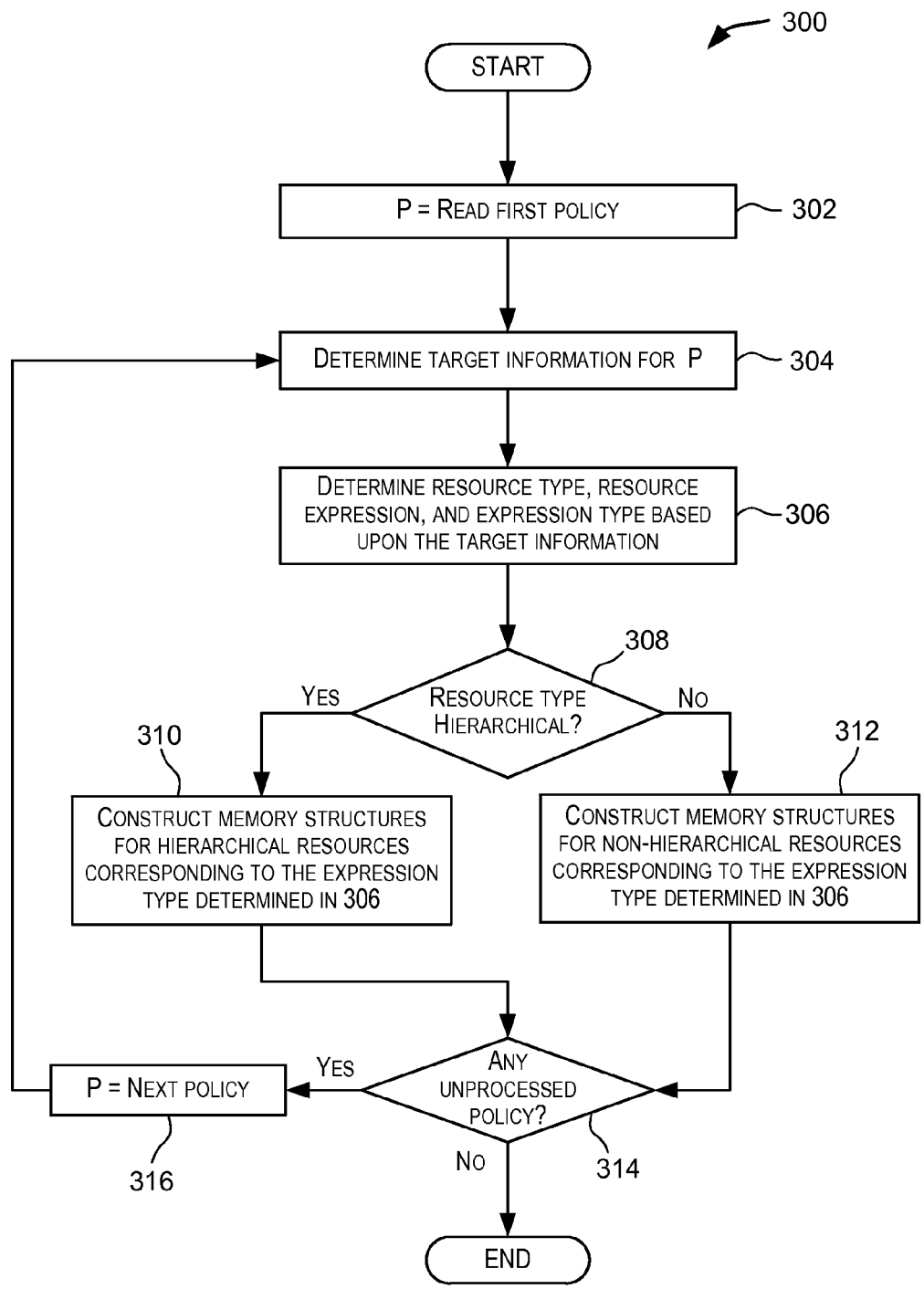
FIG. 3 depicts a simplified flowchart depicting processing performed in the startup or initialization phase by an authorization system according to an embodiment of the present invention.

FIG. 3 depicts a simplified flowchart 300 depicting processing performed in the startup or initialization phase by authorization system 102 according to an embodiment of the present invention. The processing depicted in FIG. 3 may be implemented in software (e.g., code, instructions, program) executed by one or more processors, hardware, or combinations thereof. The software may be stored on a non-transitory computer-readable storage medium. The particular series of processing steps depicted in FIG. 3 is not intended to limit the scope of embodiments of the present invention. In one embodiment, the processing depicted in FIG. 3 may be performed by cache builder module 116 depicted in FIG. 1.

As depicted in FIG. 3, at 302 a first policy (P=first policy) configured for an enterprise system may be read. At 304, target information specified by policy P is determined. The processing in 304 may include determining a resource expression specified by policy P, where the resource expression identifies the one or more resources that are the targets of policy P. The processing in 304 also includes determining the resource type for the targeted one or more resources.

For example, policy P may be defined as
Policy P=(<Target Information>, <Rules Information>)
and the Target Information may be defined as
Target Information=(Subject Info, Resource Info, Action Info, Environment Info) and the Resource Info may include
Resource Info=(Resource Type, Resource Expression, Resource Attributes)
In such an embodiment, in 304, the target information may be determined for policy P.

In 306, a resource type, a resource expression, and a type of the resource expression are then determined based upon the target information for policy P determined in 304. For example, if the target information for the policy P is
Target Info=(Subject=Joe; Resource Info, Action=View; Environment=9 am-5 pm)
where Resource Info=(Hierarchical, "/page/.*")
then, in 306, the resource type is determined to be hierarchical and the resource expression is determined as "/page/.*". As another example, if the target information for the policy P is
Target Info=( . . . ; Resource Info; Action=Edit; . . . ),
where Resource Info=(Non-hierarchical, "aFile")
Then, in 306, the resource type is determined to be non-hierarchical and the resource expression is "aFile".

Referring back to 306 in FIG. 3, in addition to a resource type and a resource expression, an expression type is also determined for the resource expression in 306. In one embodiment, the expression type for a resource expression is determined based upon the resource expression. Using the resource hierarchy depicted in FIG. 4 as an example, the following Table A shows examples of different resource expressions and their corresponding expression types:

TABLE A

| Resource expression | Expression Type |
| --- | --- |
| "/my.oracle.com/CRM/App2/Page2" | Exact expression, which defines a resource from the root of the hierarchy to a leaf of the hierarchy. |
| "/my.oracle.com/CRM/App2/.*" | Prefix expression (or "starts with" expression), which defines a resource from the root but not all the way to a leaf. |
| ".*/Page1/Menu2" | Postfix expression (or "ends with" expression), which defines a resource from the leaf but not all the way to the root. |
| ".*/Menu1/.*" | Contains expression, which contains neither the root nor the leaf of the resource hierarchy. |
| etc. | Other customized expressions |

As shown above, for hierarchical resources, the resources targeted by a policy may be articulated in different ways by a resource expression. In some embodiments, a hierarchy path may be used to identify the targeted one or more resources. In one embodiment, such a resource expression may comprise one or more path components separated by delimiters. A path component may refer to a resource. Each path component may be one or more characters long. In one embodiment, a preconfigured set of characters may be used as delimiters to separate the patch components in the resource expression. For example, a known set of characters such as "/", "\", ",", ":", and "$" may be used in one embodiment. Further, regular expression syntax may be used for representing wildcard characters.

For the processing in 306, the determination of an expression type for the resource expression is independent of whether the resource type indicates a hierarchical resource or a non-hierarchical resource. Table A above shows examples of resource expressions used for identifying hierarchical resources. Various resource expressions may also be used to specify non-hierarchical resources. For example, consider a non-hierarchical resource "abcde". Since the resource in non-hierarchical, there is no hierarchical path involved in identifying the resource. Like with resource expressions for hierarchical resources, regular expression syntax may be used with resource expressions for non-hierarchical resources. The resource expression for a non-hierarchical resource can comprise one or more characters, which may be considered to be components of the resource expression. The following Table B shows examples of various expression types for a non-hierarchical resource named "abcde".

TABLE B

| Resource expression | Expression Type |
| --- | --- |
| "abcde" | Exact expression |
| "abc.*" | Prefix expression (or "starts with" expression) |
| ".*de" | Postfix expression (or "ends with" expression) |
| ".*bc.*" | Contains expression |
| etc. | Other customized expressions |

Referring back to FIG. 3, after the resource type, resource expression, and expression type are determined in 306, a check is made in 308 to see if the resource type determined in 306 is hierarchical or non-hierarchical. Appropriate processing is then performed based upon the result of the check performed in 308. In the embodiment depicted in FIG. 3, it is assumed that there are only two resource types, hierarchical and non-hierarchical. However, in alternative embodiments, other resource types may be configured, possibly more than two. In such an embodiment, processing is performed in 308 to determine the particular resource type determined in 306 for the policy being processed and appropriate processing is then performed based upon the resource type.

As shown in FIG. 3, if it is determined in 308 that the resource type is hierarchical, then in 310, memory structures are constructed and stored for the hierarchical resource type and further for the expression type determined in 306. As described above, the resource expression for a hierarchical resource may comprise one or more path components separated by delimiters. In one embodiment, as part of 310, the path components are extracted from a resource expression, and a memory structure built for the resource expression based upon the path components. For example, for a resource expression "/server/oracle/com", the path components are "server", "oracle", and "com". In one embodiment, a sparse tree may be built with each node of the sparse tree representing a path component in the resource expression. The hierarchical relationships between the nodes in the sparse tree may be configured such that the hierarchical relationships between the path components in the resource expression are preserved. Further details are provided below with respect to FIGS. 9A, 9B, 10A, 10B, 11A, 11B, 12A, and 12B.

Likewise, if it is determined in 308 that the resource type corresponding to the resource expression being processed is non-hierarchical, then in 312, memory structures (e.g., caches) are constructed and stored for the non-hierarchical resource type and further for the expression type determined in 306. Non-hierarchical resources are not part of any hierarchy. Accordingly, the resource expressions for non-hierarchical resources do not comprise any path components but comprise one or more characters. A resource expression identified a non-hierarchical resource using one or more characters, which may include zero or more regular expression characters. In one embodiment, as part of 312, the character components (excluding regular expression characters) are extracted from a resource expression, and a memory structure built for the resource expression based upon the path components. For example, for a resource expression "abcd.*", the character components are "a", "b", "c", and "d". In one embodiment, a sparse tree may be built with each node of the sparse tree representing a character component in the resource expression. The order in which the characters appear in the resource expression is preserved in the sparse tree by forming appropriate relationships between the nodes in the sparse tree. Further details are provided below with respect to FIGS. 13, 14A, 14B, 14C, 15A, 15B, 16A, and 16B.

In this manner, separate memory structures are built and stored for hierarchical resource types and for non-hierarchical resource types. Further, within the memory structures for a particular resource type, separate memory structures are constructed and populated for the different expression types determined for the resource expressions.

A check is then made in 314 to see if there is any unprocessed policy (i.e., is there any policy for which steps 304, 306, 308, and 310/312 have not yet been performed). If it is determined in 314 that there is at least one unprocessed policy, then in 316, the next unprocessed policy is selected and referred to as policy P. Processing then continues for the newly selected policy P with 304.

As depicted in FIG. 3 and described above, during startup phase processing, the policies configured for the enterprise are processed and memory structures constructed for the policies. The memory structures store information related to the resources covered by the policies and are meant to facilitate runtime processing of authorization requests. In one embodiment, the memory structures may be caches that are constructed and stored in system memory (e.g., in a random access memory (RAM) associated with one or more processors of authorization system 102). The processing depicted in FIG. 3 and described above may also be performed during the update phase for policies that have changed or been newly added or deleted since initialization phase processing. In this manner, the memory structures constructed in 310 and 312 reflect the updated system configuration.

Figure 5:
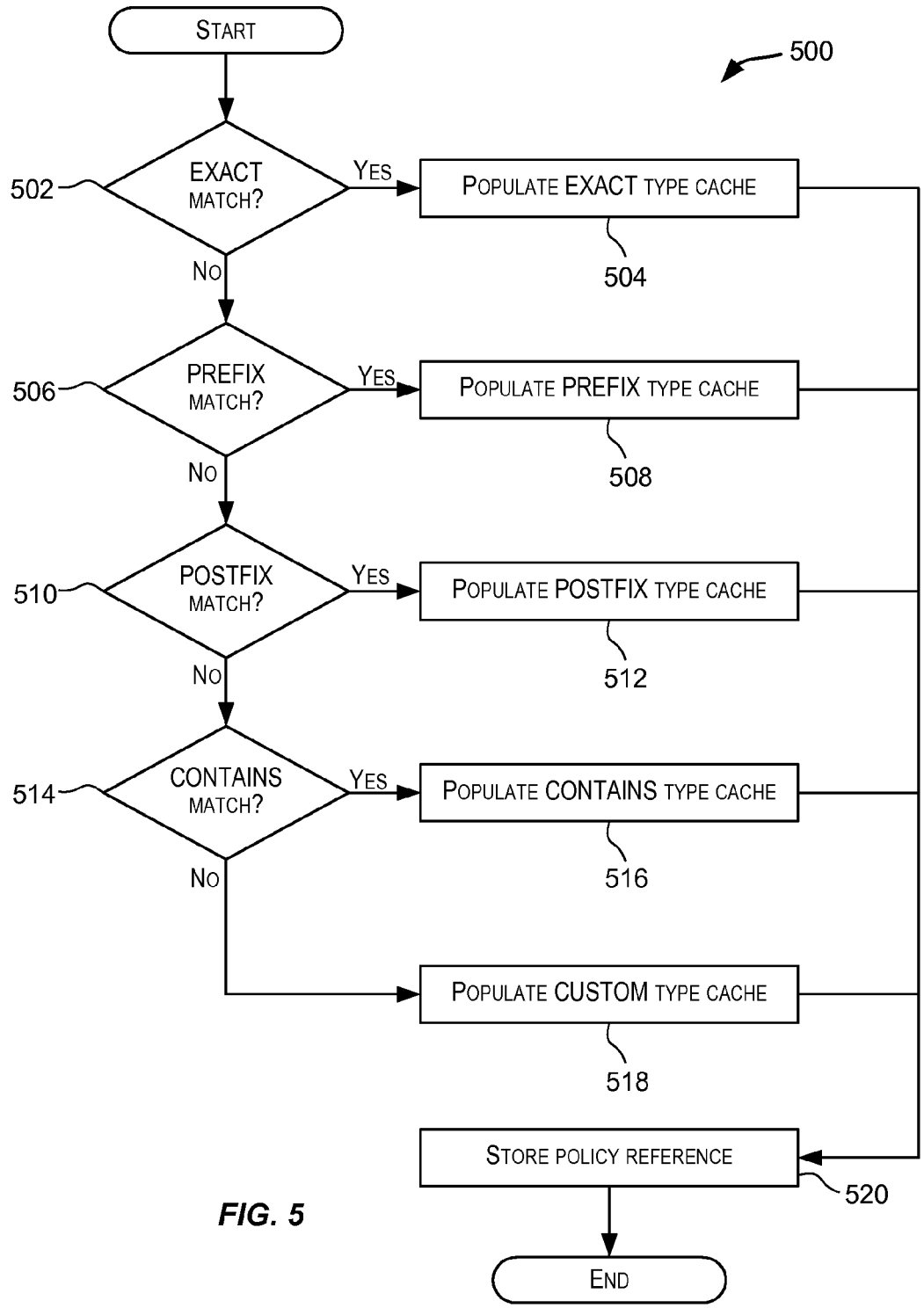
FIG. 5 depicts a simplified flowchart depicting processing performed by an authorization system for constructing memory structures corresponding to expression types according to an embodiment of the present invention.

FIG. 5 depicts a simplified flowchart 500 depicting processing performed by authorization system 102 for constructing memory structures corresponding to expression types according to an embodiment of the present invention. The processing depicted in FIG. 5 may be implemented in software (e.g., code, instructions, program) executed by one or more processors, hardware, or combinations thereof. The software may be stored on a non-transitory computer-readable storage medium. The particular series of processing steps depicted in FIG. 5 is not intended to limit the scope of embodiments of the present invention. In one embodiment, the processing depicted in FIG. 5 may be performed by cache builder module 116 depicted in FIG. 1.

In some embodiments, the processing depicted in FIG. 5 may be performed in 310 or 312 in FIG. 3. The processing depicted in FIG. 5 assumes that a particular resource type (e.g., hierarchical or non-hierarchical) has been determined from the target information for a policy being processed and memory structures are to be constructed for the particular resource type based upon the expression type determined for the resource expression. As depicted in FIG. 5, in 502, a check is made to see if the determined expression type is an exact match expression type. If so, in 504, memory structures corresponding to the exact expression type are built and populated and processing then continues with 520. As part of 504, new memory structures may be created and stored or previously created and stored memory structures may be augmented to store information representing the policy being processed. Examples of resource expressions of type exact match include "/my.oracle.com/CRM/App2/Page2 ", "abcde", and the like.

If it is determined in 502, that the resource expression is not an exact match expression type, then a check is made in 506 to see if the determined resource expression type is a prefix expression type. If so, in 508, memory structures corresponding to the prefix expression type are populated and processing then continues with 520. Examples of resource expressions of type prefix include "/my.oracle.com/CRM/App2/.*" (for a hierarchical resource), "abc.*" (for a non-hierarchical resource), and the like.

If it is determined in 506 that the resource expression is not a prefix expression type, then a check is made in 510 to see if the determined resource expression type is a postfix expression type. If so, in 512, memory structures corresponding to the postfix expression type are populated and processing then continues with 520. Examples of resource expressions of type postfix include ".*/Page1/Menu2 " (for a hierarchical resource), ".*de" (for a non-hierarchical resource), and the like.

If it is determined in 510, that the resource expression type is not a postfix expression type, then a check is made in 514 to see if the determined resource expression type is a contains expression type. If so, in 516, memory structures corresponding to the contains expression type are populated (step 516) and processing then continues with 520. Examples of resource expressions of type contains include ".*/Menu1/.*" (for a hierarchical resource), ".*bc.*" (for a non-hierarchical resource), and the like.

If it is determined based upon 502, 506, 510, and 514, that the expression type for the resource expression in the policy being processed does not match any of the predefined expression types, then in 518, the resource expression is tagged as a custom expression type and memory structures corresponding to the custom expression type are populated and processing then continues with 520.

After one or more memory structures corresponding to a particular expression type have been populated or updated, in 520, a reference is stored from that memory structure to the policy being processed. For example, if policy P1 is being processed and comprises a resource expression "/my.oracle.com/CRM/App2/Page2 ", then a reference is stored from the memory structure populated for the resource expression to policy P1. This enables the policy specifying the resource expression for which the memory structure is being populated to be easily identified and accessed from the memory structure itself.

In flowchart 500 depicted in FIG. 5 and described above, it is assumed that four expression types are configured, namely, exact, prefix, postfix, and contains, and anything not falling in these four types is tagged as a custom type. In alternative embodiments, various other (more or less) expression types may be defined. Accordingly, the expression types described in this disclosure are meant only to be examples and are not intended to limit the scope of embodiments of the present invention as recited in the claims.

As described above, separate memory structures are constructed based upon the resource type identified by the policy being processed. Further, for each resource type, separate memory structures are constructed for different expression types. In some embodiments, the memory structures comprise data structures, each comprising one or more nodes. In one embodiment, the memory structures are sparse trees comprising one or more nodes. A sparse tree may represent and store information for one or more policies and store one or more references to the one or more policies represented by the sparse tree. This enables one or more policies represented by a sparse tree to be identified and possibly accessed from the sparse tree. Authorization system 102 uses the memory structures constructed in FIG. 5 for runtime processing of authorization requests.

Figure 6:
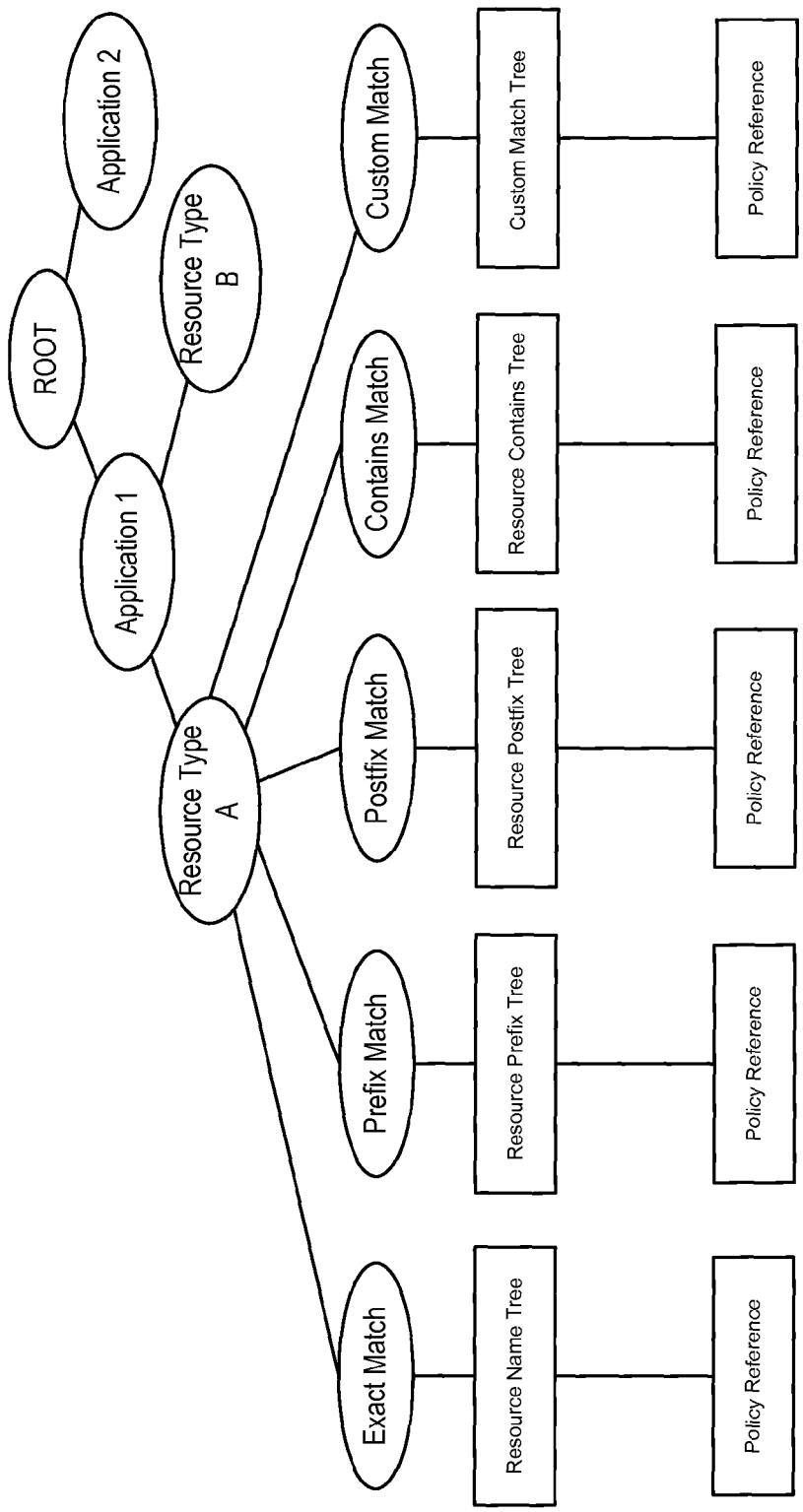
FIG. 6 shows a simplified high-level structure or organization of memory structures constructed during the initialization phase according to an embodiment of the present invention.

FIG. 6 shows a simplified high-level structure or organization of memory structures constructed during initialization phase according to some embodiments of the present invention.

The structure depicted in FIG. 6 is not intended to be limiting. In the embodiment depicted in FIG. 6, starting from the root, it can be seen that the memory structures are constructed on a per application basis. For example, a set of memory structures are constructed for Application_1, another set for Application_2, and so on. The set of memory structures for Application_1 includes all the structures in the subtree rooted at Application_1. Likewise, the set of memory structures for Application_2 includes all the structures in the subtree rooted at Application_2.

The memory structures constructed for an application can be further divided based upon the resource type. For example, the memory structures constructed for Application_1 may comprise a first set of memory structures for Resource_Type_A (e.g., for hierarchical resource type) including all memory structures in the subtree rooted at Resource_Type_A, a second set of memory structures for Resource_Type_B (e.g., for non-hierarchical resource type) including all memory structures in the subtree rooted at Resource_Type_B, and so on. Accordingly, in the embodiment depicted in FIG. 5, the set of memory structures for each application comprises sets of memory structures corresponding to the various resource types.

The set of memory structures for a resource type in turn may comprise different sets of memory structures corresponding to the different expression types. For example, the set of memory structures for Resource_Type_A under Application_1 may comprise a first set of memory structures for "exact" expression type, a second set of memory structures for "prefix" expression type, a third set of memory structures for "postfix" expression type, a fourth set of memory structures for "contains" expression type, and so on.

The memory structures constructed during the initialization phase are then used to process authorization requests during runtime processing. As part of this processing, upon receiving an authorization request, as part of processing the authorization request, information stored by the memory structures is used to identify a set of policies that are applicable for the authorization request. The authentication of the authorization request depends upon the evaluation of these identified applicable policies.

Figure 7:
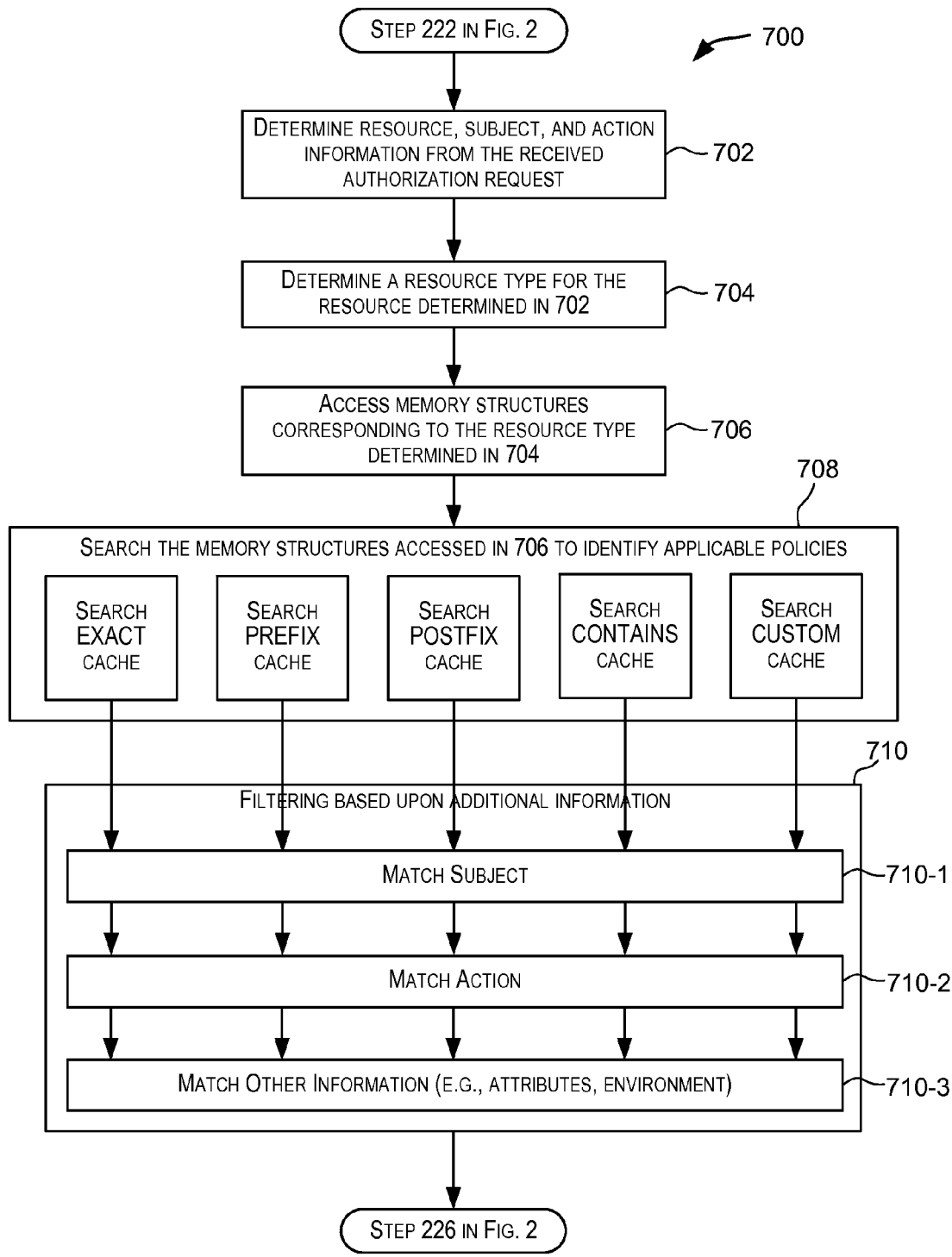
FIG. 7 depicts a simplified flowchart depicting processing performed by an authorization system for processing authorization requests using the memory structures constructed during the initialization phase according to an embodiment of the present invention.

FIG. 7 depicts a simplified flowchart 700 depicting processing performed by authorization system 102 for processing authorization requests using the memory structures constructed during the initialization phase according to an embodiment of the present invention. The processing depicted in FIG. 7 may be implemented in software (e.g., code, instructions, program) executed by one or more processors, hardware, or combinations thereof. The software may be stored on a non-transitory computer-readable storage medium. The particular series of processing steps depicted in FIG. 7 is not intended to limit the scope of embodiments of the present invention. In one embodiment, the processing depicted in FIG. 7 may be performed by policy matcher module 118 depicted in FIG. 1 and may be performed as part of step 224 depicted in FIG. 2.

Processing may be initiated when an authorization request is received as in 222 in FIG. 2. In 702, the resource, subject, and action information specified in the authorization request is determined. Other information such as contextual information, if any, in the authorization request may also be determined in 702. For example, an authorization request may be received indicating that Subject=Joe is requesting authorization to perform Action=View on Resource="/my.oracle.com/CRM/App2/Page2".

In 704, the resource type for the resource determined in 702 is then determined. In one embodiment, information may be stored identifying the various available resources and, for each resource, the resource type for the resource. This information may, for example, be configured by a system administrator when the resource is provisioned. In some embodiments, authorization system 102 may access this preconfigured resources information to determine a resource type for the resource identified by the authorization request.

In 706, memory structures corresponding to the resource type determined in 704 are accessed. In 708, the memory structures accessed in 706 are then searched using the resource identified in the authorization request to identify a set of policies that are applicable for the received authorization request. The processing performed in 708 identifies policies whose targeted resources include the resource identified in the received authorization request. The memory structures built during the initialization (and update) phase facilitate these applicable policies to be identified in an efficient manner.

In one embodiment, as part of 708, for the resource type, the memory structures corresponding to each of the expression types for that resource type are searched to identify policies, if any, that are applicable to the authorization request based upon the resource identified in the authorization request. For example, as depicted in FIG. 7, memory structures corresponding to exact, prefix, postfix, contains, and custom expression types may each be searched to identify matches, if any, to the resource specified in the authorization request. A match to a policy occurs if the resource identified by the resource expression being processed falls within the resources targeted by the policy. If there is a match, then the memory structure that resulted in the match may be used to determine one or more policies for the match. Further details related to the matching process are provided below using various examples depicted in FIGS. 8, 9A, 9B, 10A, 10B, 11A, 11B, 12A, and 12B.

The search of memory structures corresponding to an expression type may yield zero or more matches thereby identifying a set of zero or more policies as being applicable for the authorization request based upon the resource specified by the authorization request. Accordingly, the processing performed in 708 may yield a set of zero or more applicable policies. The set represents policy matches identified based upon the resource identified in the authorization request and information stored by the various caches. If zero policies result from the matching performed in 708, then the authorization of the authorization request may be considered to be unsuccessful.

The applicable policies determined from resource matching performed in 708 are then further filtered or culled down in 710 based upon other information related to the received authorization request. For example, in 710-1, filtering may be performed based upon the subject identified in the authorization request. In one embodiment, in 710-1, the subject identified in the authorization request is compared to each policy in the policies determined in 708 to identify those policies where there is a subject match. A policy for which the subject identified by the policy does not match the subject identified in the authorization request is removed or filtered out from the list of applicable policies. In this manner, the set of applicable policies determined from matching the resource in the authorization request in 708 is further filtered or culled down based upon the subject information specified in the authorization request.

The filtered down set of applicable policies may be further filtered in 710-2 based upon the action identified in the authorization request. In one embodiment, the action in the authorization request is compared to each policy in the filtered set of applicable policies to identify those policies where there is an action match (i.e., the action indicated in the authorization request falls within the actions targeted by a policy). A policy for which the action identified by the policy does not match the action identified in the authorization request is removed or filtered out from the list of applicable policies. In this manner, the set of policies determined from matching the resource and subject in the authorization request is further filtered or culled down based upon the action specified in the authorization request.

The filtered list of applicable policies may be further filtered down in 710-3 based upon other information that may be associated with the authorization request. For example, the authorization request may indicate environment information and a matching may be performed to identify those policies in the filtered set of applicable policies that match the environment information; other non-matching policies may be filtered out. In some embodiments, attributes associated with a resource identified in the authorization request may be used as the matching criteria to identify policies that match the attributes. For example, for a given web URL resource, the authorization request may indicate that the URL must show page color blue (where color=blue is the attribute of the web page for that URL). This may be used for matching and filtering applicable policies.

For hierarchical resources, a resource may inherit attributes from it ancestors. For example, given a hierarchical resource /A/B/C/ with each node having a color attribute, if the color for node A is "Red" then nodes B and C, which are children of node A in the resource hierarchy, will inherit the color "Red" from node A. The colors associated with nodes B and C can however be overwritten. For example, the color for node B can be set to "Blue", which will override the inherited color "Red".

The processing performed in 710 may yield a set of applicable policies comprising zero or more policies. If the set of applicable policies comprises zero policies, in one embodiment, the authorization of the authorization request may be considered to be unsuccessful. If the set of applicable policies comprises at least one policy, each applicable policy is then evaluated according to the processing performed in 226 and 228 in FIG. 2 and described above.

As described above, in some embodiments, two resource types may be configured for an enterprise system: hierarchical or non-hierarchical. Each resource in such an enterprise may be categorized as either a hierarchical resource or a non-hierarchical resource depending upon whether or not the resource is part of a resource hierarchy. The following sections describe processing described above, including construction of memory structures and processing of authorization requests using these memory structures, as specifically applied to hierarchical resources and non-hierarchical resources. The following description is not intended to be limiting.

Hierarchical Resources

Figure 8:
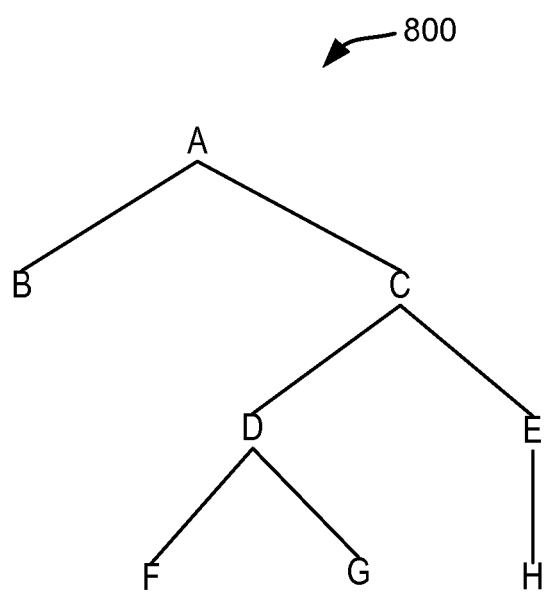
FIG. 8 depicts an example resource hierarchy.

The resource hierarchy depicted in FIG. 8 will be used as an example to explain processing of authorization requests for hierarchical resources. This resource hierarchy is not intended to be limiting. FIG. 8 depicts a simplified resource hierarchy 800 comprising resources A, B, C, D, E, F, G, and H each of which is a hierarchical resource. In FIG. 8 and the examples described below, for sake of simplicity, the name of each resource is assumed to be one character long (e.g., "A", "B", "C", etc.). However, this is not intended to be limiting. A hierarchical resource's name may be one or more characters long.

As shown in FIG. 8, resource A is at the top of the resource hierarchy. Resource A has two child resources B and C. Resource C in turn has two child resources D and E. Resource D has two child resources F and G. Resource E has a child resource H. Resources B, F, G, and H represent leaves in the hierarchy. Further, it is assumed that access to the resources depicted in FIG. 8 is controlled using the following policies:

P1: (<Subject=Greg; Resource=(Hierarchical, "/A/C/E/H"), Action=View>, <Rules>)
P2: (<Subject=Joe; Resource=(Hierarchical, "/A/C/.*"), Action=Edit>, <Rules>)
P3: (<Subject=Joe; Resource=(Hierarchical, "/A/C/D/.*"), Action=View>, <Rules>)
P4: (<Subject=Joe; Resource=(Hierarchical, ".*/E/H"), Action=View>, <Rules>)
P5: (<Subject=Joe; Resource=(Hierarchical, ".*/C/D/.*"), Action=View>, <Rules>)
P6: (<Subject=Joe; Resource=(Hierarchical, "/A/C/D/F"), Action=View>, <Rules>)
P7: (<Subject=Joe; Resource=(Hierarchical, ".*/E/.*"), Action=View>, <Rules>)
P8: (<Subject=Joe; Resource=(Hierarchical, ".*/C/D/F"), Action=View>, <Rules>)

Initialization Phase Processing (for Hierarchical Resources)

During initialization phase, per step 212 in FIG. 2, the policies configured for an enterprise system are scanned and target information for the policies identified. Memory structures are then constructed for the policies per step 214 in FIG. 2. Each individual policy may be processed according to flowchart 300 depicted in FIG. 3. Accordingly, policies P1 to P8 are scanned and memory structures built for the policies. In one embodiment, the policies are scanned and processed in sequential order, for example, policy P1 will be processed first, followed by policy P2, followed by policy P3, and so on. For each policy, a resource type, a resource expression, and the expression type for the resource expression are determined and used to build the memory structures. In this example, the policies all refer to hierarchical resources. However, this is not intended to be limiting. Generally, policies may be configured for hierarchical and non-hierarchical resources. The memory structures that are constructed are then used to process authorization requests. The initialization phase processing performed for the various expressions types is described below. The following sections describe processing performed for the different types of resource expression. For sake of this example, it is assumed that the memory structures are sparse trees comprising one or more nodes.

(1) Exact Expression Type (Initialization Phase Processing for Hierarchical Resources)

Authorization system 102 will determine that the resource expressions for policies P1 and P6 are of the exact expression type.

P1: (<Subject=Greg; Resource=(Hierarchical, "/A/C/E/H"), Action=View>, <Rules>)
P6: (<Subject=Joe; Resource=(Hierarchical, "/A/C/D/F"), Action=View>, <Rules>)

In one embodiment, an exact expression type resource expression for a hierarchical resource specifies a resource in its entirety from the root of the resource hierarchy to the particular leaf resource.

Figure 9A:
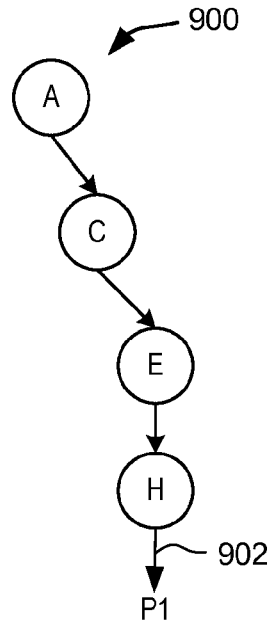
FIGS. 9A, 9B, 10A, 10B, 11A, 11B, 12A, and 12B depict examples of memory structures that may be constructed for various expression types for hierarchical resources according to an embodiment of the present invention.

Assuming that P1 is processed before P6, a sparse tree 900 is constructed for P1 as depicted in FIG. 9A. The resource expression is processed to extract the path components (each of which may be a resource) in the resource expression and the path components are then processed from left to right as they appear in the resource expression. Sparse tree 900 is built based upon the path components, starting from the left-most path component ("A") to the leaf path ("H") component. Sparse tree 900 is built in a top to bottom (in terms of the hierarchy) manner. Sparse tree 900 has four nodes corresponding to path components A, C, E, and H identified in the resource expression for P1. In tree 900, the nodes corresponding to the path components are hierarchically arranged in such a way so as to preserve and represent the hierarchical relationships between the path components in P1's resource expression. A reference 902 is stored from leaf node H to policy P1.

Figure 9B:
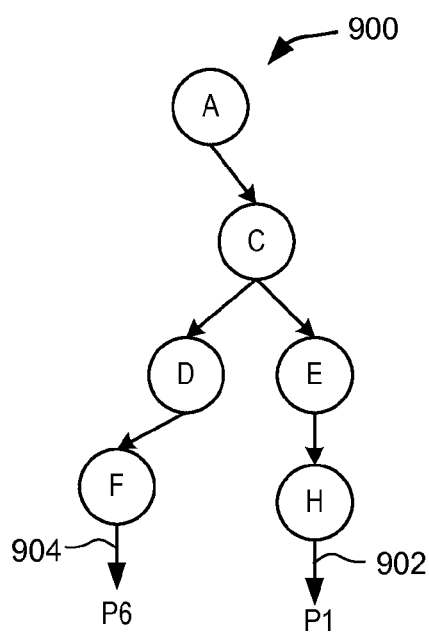

When policy P6 is processed, P6's resource expression is processed to extract the path components (each of which may be a resource) in the resource expression and the path components are then processed from left to right as they appear in the resource expression. Sparse tree 900 is augmented based upon the path components, starting from the left-most path component ("A") to the leaf path ("F") component. It is determined that tree 900 built after processing P1 already comprises nodes for path components A and C. Accordingly, these nodes are reused for representing the resource expression for P6. Accordingly, as depicted in FIG. 9B, sparse tree 900 is augmented for P6 by adding two nodes corresponding to path components D and F. Again, the hierarchical relationships between the path components, as indicated in P6's resource expression, are preserved in sparse tree 900. A reference 904 is stored from leaf node F to information identifying policy P6.

Sparse tree 900 depicted in FIG. 9B represents the memory structure built for policies P1 and P6. Since these are the only exact expression type policies in P1-P8, sparse tree 900 in FIG. 9B represents the memory structure built for the exact expression type for hierarchical resources.

(2) Prefix Expression Type (Initialization Phase Processing for Hierarchical Resources)

Authorization system 102 will determine that the resource expressions for policies P2 and P3 are of the prefix expression type.

P2: (<Subject=Joe; Resource=(Hierarchical, "/A/C/.*"), Action=Edit>, <Rules>)
P3: (<Subject=Joe; Resource=(Hierarchical, "/A/C/D/.*"), Action=View>, <Rules>)

In one embodiment, a prefix expression type resource expression for a hierarchical resource specifies path components from a root resource in the resource hierarchy but does not go all the way to a leaf resource but instead ends using a regular expression character.

Figure 10A:
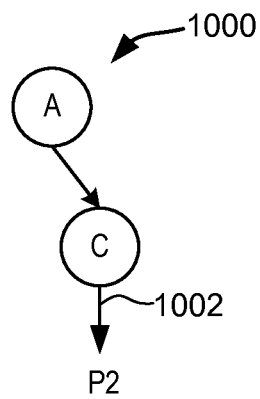

Assuming that P2 is processed before P3, a sparse tree 1000 is constructed for P2 as depicted in FIG. 10A. The resource expression is processed to extract the path components (each of which may be a resource) in the resource expression and the path components are then processed from left to right as they appear in the resource expression. Sparse tree 1000 depicted in FIG. 10A is built based upon the path components, starting from the left-most path component ("A") to the right. Sparse tree 1000 is built in a top to bottom (in terms of the hierarchy) manner. Sparse tree 1000 has two nodes corresponding to path components A and C identified in the resource expression for P2. In tree 1000 in FIG. 10A, the nodes corresponding to the path components are hierarchically arranged in such a way so as to preserve and represent the hierarchical relationships between the path components in P2's resource expression. A reference 1002 is stored from leaf node C to information identifying policy P2.

Figure 10B:
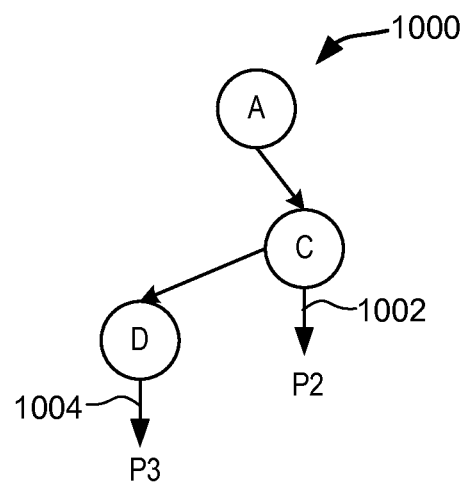

When policy P3 is processed, P3's resource expression is processed to extract the path components (each of which may be a resource) in the resource expression and the path components are then processed from left to right as they appear in the resource expression. Sparse tree 1000 is augmented based upon the path components, starting from the left-most path component ("A") to path component D. It is determined that tree 1000 built after processing P2 already comprises nodes for path components A and C. Accordingly, these nodes are reused for representing the resource expression for P3. Accordingly, as depicted in FIG. 10B, sparse tree 1000 is augmented by adding a node corresponding to resource D. Again, the hierarchical relationships between the path components, as indicated in P3's resource expression, are preserved in sparse tree 1000. A reference 1004 is stored from the leaf node representing D to information identifying policy P3.

Sparse tree 1000 depicted in FIG. 10B represents the memory structure built for policies P2 and P3. Since these are the only prefix expression type policies in P1-P8, sparse tree 1000 in FIG. 10B represents the memory structure built for the prefix expression type for hierarchical resources.

In one embodiment, to simplify and optimize sparse tree construction, the prefix type resource expressions may be sorted based upon the number of path components specified in the resource expressions. Sparse tree construction may then be performed in order starting with the resource expression in sorted list with the highest number of path components. For example, in the above example, after the sorting, resource expression for P3 would rank higher in the sorted list than P2 and as a result the sparse tree for P3 would be constructed before constructing the sparse tree for P2. Sorting and then performing sparse tree constructions enables sparse tree construction to be performed efficiently, especially where one or more path components are common to multiple resource expressions. Building sparse trees in this manner ensures that processing for a shorter resource expression does not have to reposition the top side resource node to become a subtree of a longer resource expression.

(3) Postfix Expression Type (Initialization Phase Processing for Hierarchical Resources)

Authorization system 102 will determine that the resource expressions for policies P4 and P8 are of the postfix expression type.

P4: (<Subject=Joe; Resource=(Hierarchical, ".*/E/H"), Action=View>, <Rules>)

P8: (<Subject=Joe; Resource=(Hierarchical, ".*/C/D/F"), Action=View>, <Rules>)

In one embodiment, a postfix expression type resource expression for a hierarchical resource specifies one or more path components starting from a leaf of a resource hierarchy (i.e. from the bottom of the resource hierarchy towards the top) but does not specify all the path components to the root of the resource hierarchy.

Figure 11A:
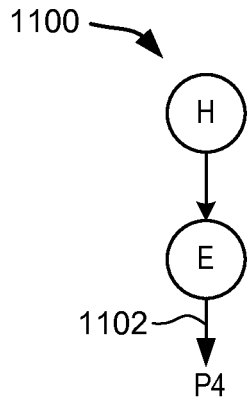

Assuming that P4 is processed before P8, a sparse tree 1100 is constructed for P4 as depicted in FIG. 11A. The resource expression is processed to extract the path components (each of which may be a resource) in the resource expression and the path components are then processed from right to left as they appear in the resource expression. Sparse tree 1100 depicted in FIG. 11A is built based upon the path components, starting from the right-most path component ("H") to the left. Alternatively, the resource expression is first reversed and the path components extracted from the reversed resource expression can then be processed in a left-most to right-most manner. Sparse tree 1100 is built in a bottom to top (in terms of the hierarchy) manner starting with a node representing a leaf path component. Sparse tree 1100 has two nodes corresponding to path components H and E identified in the resource expression for P4. In tree 1100 in FIG. 11A, the nodes corresponding to the path components are hierarchically reversed but preserve the relationships between the path components in P4's resource expression. A reference 1102 is stored from the node representing E to information identifying policy P4.

Figure 11B:
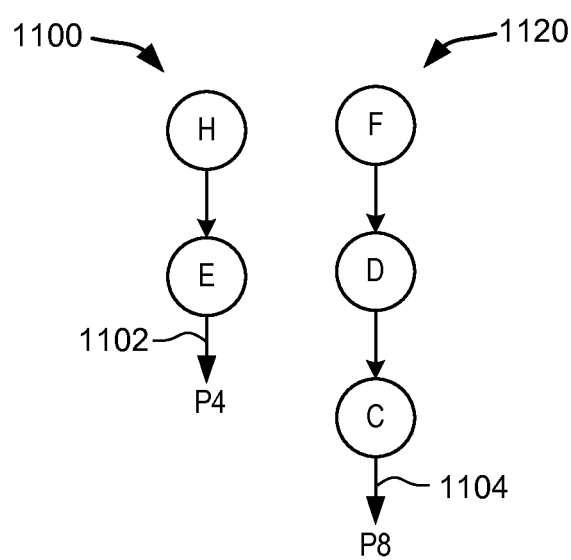

When policy P8 is processed, P8's resource expression is processed to extract the path components (each of which may be a resource) in the resource expression and the path components are then processed from right to left as they appear in the resource expression. It is determined that there is no overlap in path components between the resource expressions of P4 and P8. Consequently, a separate sparse tree 1120 is constructed to represent the resource expression for P8. As depicted in FIG. 11B, sparse tree 1120 comprises three nodes corresponding to patch components F, D, and C identified in the resource expression for P8. Sparse tree 1200 is built in a bottom to top (in terms of the hierarchy) manner starting with a node representing a leaf path component, starting with a node representing F, followed by a node representing D, and followed by a node representing C. Again, the hierarchical relationships between the path components, as indicated in P8's resource expression, are preserved in reverse manner in sparse tree 1120. A reference 1104 is stored from the node representing C to information identifying policy P8.

As depicted in FIG. 11B, sparse tree 1100 represents the memory structure built for policy P4 and sparse tree 1120 represents the memory structure for policy P8. Since these are the only postfix expression type policies in P1-P8, sparse trees 1100 and 1120 depicted in FIG. 11B represent the memory structures built for the postfix expression type for hierarchical resources.

In one embodiment, to simplify and optimize sparse tree construction, the postfix type resource expressions may be sorted based upon the number of path components specified in the resource expressions. Sparse tree construction may then be performed in order starting with the resource expression in sorted list with the higher number of path components. For example, in the above example, after the sorting, resource expression for P8 would rank higher in the sorted list than P4 and as a result the sparse tree for P8 would be constructed before constructing the sparse tree for P4. Sorting and then performing sparse tree constructions enables sparse tree construction to be performed efficiently, especially where one or more path components are common to multiple resource expressions. Building sparse trees in this manner ensures that processing for a shorter resource expression does not have to reposition the top side node to become a subtree of a longer resource expression.

In the example above, the path components are each considered to be only one character long for reasons of simplicity. However, each path component may have one or more characters. In such a scenario, a postfix resource expression for a policy P1 may be ".*server/oracle/com" and for another policy P2 may be ".*ver/oracle/com". In this case, any resource that ends with "server/oracle/com" such as "mailserver.oracle.com" or "webserver.oracle.com" falls under policies P1 and P2. In this case, a sparse tree may be built comprising two nodes, one for "oracle" and another for "com". A reference is then stored from the node representing "oracle" to a list of policies including {P1:".*server"; P2:".*ver"}.

The description above regarding a reference to a list of policies is also applicable for other expression types.

(4) Contains Expression Type (Initialization Phase Processing for Hierarchical Resources)

Authorization system 102 will determine that the resource expressions for policies P5 and P7 are of the contains expression type.

P5: (<Subject=Joe; Resource=(Hierarchical, ".*/C/D/.*"), Action=View>, <Rules>)

P7: (<Subject=Joe; Resource=(Hierarchical, ".*/E/.*"), Action=View>, <Rules>)

In one embodiment, a contains type resource expression for a hierarchical resource is a combination of the prefix expression type and the postfix expression type. A contains type resource expression specifies one or more path components but not all the way to the root of the hierarchy or to a leaf of the resource hierarchy.

Figure 12A:
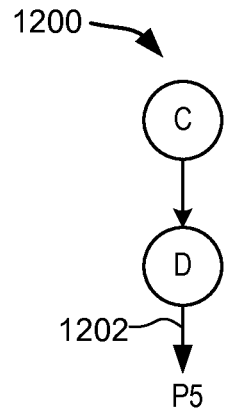

Assuming that P5 is processed before P7, a sparse tree 1200 is constructed for P5 as depicted in FIG. 12A. The resource expression is processed to extract the path components (each of which may be a resource) in the resource expression and the path components are then processed from left to right as they appear in the resource expression. Sparse tree 1200 depicted in FIG. 12A is built based upon the path components, starting from the left-most path component ("C") to the right. Sparse tree 1200 is built in a top to bottom (in terms of the hierarchy) manner. Sparse tree 1200 has two nodes corresponding to path components C and D identified in the resource expression for P5. In tree 1200 in FIG. 10A, the nodes corresponding to the path components are hierarchically arranged in such a way so as to preserve and represent the hierarchical relationships between the path components in P5 's resource expression. A reference 1202 is stored from node D to information identifying policy P5.

When policy P7 is processed, P7 's resource expression is processed to extract the path components (each of which may be a resource) in the resource expression and the path components are then processed from left to right as they appear in the resource expression. It is determined that the resource expressions for P5 and P7 do not share any common path components. Accordingly, a new sparse tree 1220 is built to represent the resource expression for P7. Sparse tree 1220 comprises a single node representing path component E in P7 's resource expression. A reference 1204 is stored from the node representing path component E to information identifying policy P7.

Figure 12B:
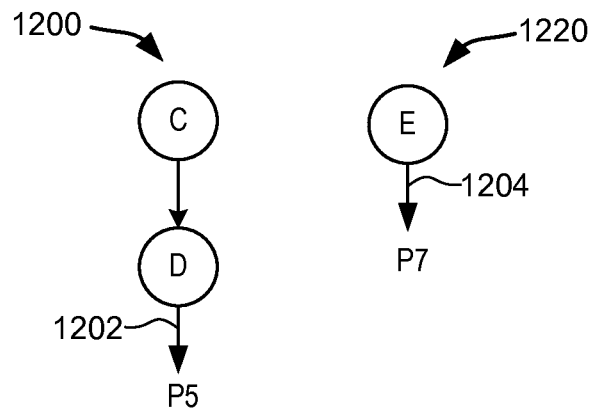

As depicted in FIG. 12B, sparse tree 1200 represents the memory structure built for policy P5 and sparse tree 1220 represents the memory structure for policy P7. Since these are the only contains expression type policies in P1-P8, sparse trees 1200 and 1220 depicted in FIG. 12B represent the memory structures built for the contains expression type for hierarchical resources.

(5) Custom Expression Type (Initialization Phase Processing for Hierarchical Resources)

In some instances, a resource expression may not be classified as either an exact, prefix, postfix, or contains type. Such a resource expression may be classified as custom type. Customized memory structures may be constructed to enable processing of custom expression types.

For example, a resource expression associated with a policy may articulate the resource(s) to which the policy applies using other forms (i.e., those that do not fall into the exact, prefix, postfix, and contains categories). For example, a resource expression may be expressed as a regular expression that does not fall into any of the above-described expression types. Customized sparse trees may be constructed for these resource expressions. In some embodiments, a sequential matching of policy resource expressions may be performed to match a resource identified in an authorization request to a policy. Upon finding a match, resource expression to matching policies may be cached to avoid repetitive sequential match operations.

An example of a customized expression type is a resource expression such as:

P9: (<Subject=Joe; Resource=(Hierarchical, "/A/C/.*/C"), Action=View>, <Rules>)

In one embodiment, two separate sparse trees may be constructed for this resource expression:

(1) corresponding to "/A/C/.*"; and (2) corresponding to ".*/C".

The sparse tree for "/A/C/.*" is built in a manner similar to sparse trees for prefix expression types for hierarchical resources, as described above. A reference may be stored from the node for path component "C" in this sparse tree to information identifying policy P 9. The sparse tree for ".*/C" is built in a manner similar to sparse trees for postfix expression types for hierarchical resources, as described above. A reference may be stored from the node for "C" in this sparse tree to information identifying policy P9. In one embodiment, the sparse trees built for the prefix and postfix expression types for hierarchical resources may be augmented to store information for P9. For references to P9 in the prefix and postfix trees, a flag may additionally be associated with each reference to indicate that this policy is to be selected as an applicable policy only if additional condition(s) is met; the condition in this case being that the same policy P9 is selected from matching in both the sparse trees (i.e., the prefix and postfix trees) for P 9 to be selected as an applicable policy.

As shown above using the various examples, for policies targeting hierarchical resources, memory structures are constructed based upon the resource expressions specified by the policies. In one embodiment, the memory structures comprise sparse trees comprising one or more nodes. For hierarchical resources, each node in the sparse tree represents a path component identified in the resource expression. One or more sparse trees may be constructed for each expression type. For a sparse tree storing information for a resource expression corresponding to a policy, the sparse tree also stores a reference to the policy such that the policy can be identified or accessed from the sparse tree. A sparse tree may store information for one or more policies and accordingly store references to those policies.

Authorization Request Processing Phase (for Hierarchical Resources)

The memory structures built during the initialization phase (or updated during the update phase) are then used by authorization system 102 for runtime processing of authorization requests received by authorization system 102. As part of this processing, upon receiving an authorization request, authorization system 102 uses the constructed memory structures to identify a set of policies that are applicable for the received authorization request, as described above with respect to 224 in FIGS. 2 and 708 in FIG. 7.

The following section describes an example to illustrate processing performed in response to receiving an authorization request specifying a hierarchical resource. The example below assumes that memory structures have been constructed for policies targeting hierarchical resources as depicted in FIGS. 9B, 10B, 11B, and 12B. Further, the example assumes that the following authorization request is received.

Authorization Request: (Subject=Joe; Resource(Hierarchical, "/A/C/D/F"), Action=View)

As indicated by the example authorization request, Joe is requesting a view action on hierarchical resource "/A/C/D/F".

Upon receiving this request, authorization system 102 determines the subject, resource, action information, and other information, if any, specified by the authorization request (as described above with respect to 702 in FIG. 7). Authorization system 102 then determines, as per 704 in FIG. 7, a resource type specified by the authorization. For this example, the resource type is hierarchical. Authorization system 102 then accesses the memory structures constructed for hierarchical resources. For sake of this example, it is assumed that these memory structures comprise the sparse trees depicted in FIGS. 9B, 10B, 11B, and 12B. Per 708 in FIG. 7, the memory structures are then searched based upon information contained in the authorization request to identify policies that are applicable for the received authorization request based upon resources information. As part of the processing performed in 708, the memory structures corresponding to each of the different expression types are searched to find matches. This matching can be illustrated using the following examples.

(1) Exact Expression Type Matching for Hierarchical Resources

Sparse tree 900 depicted in FIG. 9B represents the memory structures constructed for exact expression type for hierarchical resources. In one embodiment, the matching for this expression type is performed by extracting the path components from the resource expression specified by the authorization request and matching these to the nodes in sparse tree 900. In one embodiment, the path component matching is performed from the left-most path component in the authorization request resource expression to the right and walking sparse tree 900 starting from the root node. In this manner, the authorization request resource expression is processed from left to right and sparse tree 900 is walked from a root node towards a leaf node to see if there is a match.

For the example authorization request, path component A is considered first and is matched to the root node A in sparse tree 900. Next, path component C is considered and is matched to the node C in sparse tree 900, which is the child of the node A. Path component D is considered next and matched to node D in tree 900, which is the child of node C. Lastly, path component F is considered and matched to node F in tree 900. Based upon this matching, it is identified that a path of nodes A-C-D-F exists in sparse tree 900 that matches "/A/C/D/F" specified in the authorization request. All the policies referenced by the nodes in sparse tree 900 that are walked during the matching process (e.g., nodes A, C, D, and F in tree 900) are then identified as policies that are applicable to the authorization request. For example, in tree 900, node F has a reference to policy P6. Accordingly, policy P6 is identified as an applicable policy for the example authorization request. Accordingly, a search of the exact type cache for hierarchical resources (per 708 in FIG. 7) yields P1 as an applicable policy for authorizing the authorization request.

(2) Prefix Expression Type Matching for Hierarchical Resources

Sparse tree 1000 depicted in FIG. 10B represents the memory structures constructed for prefix expression type for hierarchical resources. In one embodiment, the matching for this expression type is performed by extracting the path components from the resource expression specified by the authorization request and matching these to the nodes in sparse tree 1000. In one embodiment, the path component matching is performed from the left-most path component in the authorization request resource expression to the right and walking sparse tree 1000 starting from the root node. In this manner, the authorization request resource expression is processed from left to right and sparse tree 1000 is walked from a root node towards a leaf node to see if there is a match.

For the example authorization request, path component A is considered first and is matched to the root node A in sparse tree 1000. Next, path component C is considered and is matched to the node C in sparse tree 1000, which is the child of the node A. Lastly, path component D is considered next and matched to node D in tree 1000, which is the child of node C. Based upon this matching, it is identified that a path of nodes A-C-D exists in sparse tree 1000 that a portion of "/A/C/D/F" specified in the authorization request. All the policies referenced by the nodes in sparse tree 1000 that are walked during the matching process (e.g., nodes A, C, and D in tree 1000) are then identified as policies that are applicable to the authorization request. For example, in tree 1000, node C has a reference to policy P2 and node D has a reference to policy P3. Accordingly, policies P2 and P3 are identified as applicable policies for the example authorization request. Accordingly, a search of the prefix type cache for hierarchical resources (per 708 in FIG. 7) yields P2 and P3 as applicable policies for authorizing the authorization request.

(3) Postfix Expression Type Matching for Hierarchical Resources

Sparse trees 1100 and 1120 depicted in FIG. 11B represent memory structures constructed for postfix expression type for hierarchical resources. In one embodiment, the matching for this expression type is performed by extracting the path components from the resource expression specified by the authorization request and matching these to the nodes in sparse tree 1000. In one embodiment, the resource expression in the authorization request is reversed (e.g., /A/C/D/F becomes /F/D/C/A) and then the path components extracted path. Path component matching is performed from the left-most path component moving to the right and walking sparse trees 1100 and 1120. In this manner, the authorization request resource expression is reversed and processed from left to right and sparse trees 1100 and 1120 are walked to see if there is a match.

For the example authorization request, path component F is considered first and is matched to node F in sparse tree 1120. Next, path component D is considered and is matched to the node D in sparse tree 1120, which is the child of the node F. Next, path component C is considered next and matched to node C in tree 1120, which is the child of node D. Since C is the last node in tree 1120 matching ends. Based upon this matching, nodes F, D, and C in sparse tree 1000 are walked during the matching process. All the policies referenced by the nodes in sparse tree 1120 that are walked (e.g., nodes F, D, and C in tree 1120) during the matching process are then identified as policies that are applicable to the authorization request. For example, in tree 1120, node C has a reference 1104 to policy P8. Accordingly, policy P8 is identified as an applicable policy for the example authorization request. Accordingly, a search of the postfix type cache for hierarchical resources (per 708 in FIG. 7) yields P8 as an applicable policy for authorizing the authorization request.

In one embodiment, nodes representing H and F in trees 1110 and 1120 may be stored as a list. This list is traversed to identify any matching leaves to the right-most path component in the resource expression in the authorization request (e.g., path component F in the above example). Since the leaves in a resource hierarchy are all unique, the right-most component in the resource expression in the authorization request will match at most one (e.g., node F in the example above) of the nodes in the list. The sparse tree corresponding to the matching node (e.g., tree 1120 in FIG. 11B) is then walked for matching purposes to identify any policies applicable to the authorization request.

(4) Contains Expression Type Matching for Hierarchical Resources

Sparse trees 1200 and 1220 depicted in FIG. 12B represent memory structures constructed for contains expression type for hierarchical resources. In one embodiment, the matching for this expression type is performed by extracting the path components from the resource expression specified by the authorization request and matching these to the nodes in sparse trees 1200 and 1220. In one embodiment, the path component matching is performed from the left-most path component in the authorization request resource expression to the right and walking sparse trees 1200 and 1220 starting from their root nodes. In this manner, the authorization request resource expression is processed from left to right and sparse trees 1200 and 1220 are walked from a root node towards a leaf node to see if there is a match.

For the example authorization request, path component A is considered first to see if is a match to the root nodes of trees 1200 and 1220. No match is found. Next, path component C is considered and is matched to the node C in sparse tree 1200. Next, path component D is considered and matched to node D in 1200, but no match to tree 1220. Since node D is the last node in tree 1200, the matching based upon path component C in the resource expression ends. Policies associated with the walked nodes are identified as applicable policies for authorizing the authorization request. In this case, in tree 1200, nodes for path components C and D are walked and node D has a reference 1202 to policy P5, which is identified as an applicable policy.

Next, path component D, which follows path component C in the resource expression in the authorization request, is considered and found not to match roots node C or E in trees 1200 and 1220. Next, patch component F, which follows path component D in the resource expression in the authorization request, is considered and found not to match root nodes C or E in trees 1200 and 1220. Since all the path components in the resource expression specified by the authorization request have been processed, the matching processing ends.

Accordingly, a search of the contains type cache for hierarchical resources (per 708 in FIG. 7) yields P5 as an applicable policy for authorizing the authorization request.

(5) Custom Expression Type Matching for Hierarchical Resources

Sparse trees or other data structures stored for custom expressions types may be used to find matches, if any, based upon the resource expression in the received authorization request.

In the above example involving an authorization request identifying a hierarchical resource, based upon matching performed between the resource expression in the authorization request and the memory structures for exact, prefix, postfix, contains, and custom expression types, policies P1, P2, P3, P5, and P8 are identified as applicable policies for authorizing the received authorization request. These policies are then further filtered based upon the subject, action, and other information in the authorization request per 710 in FIG. 7. From matching the subject, it is determined that P1 applies to subject "Greg" and is not a match to subject "Joe" specified in the authorization request. Accordingly, subject based matching filters out P1 leaving policies P2, P3, P5, and P8 as the applicable policies for the authorization request after subject matching. Next, from matching the action, it is determined that P2 applies to action "Edit" and is not a match to action "View" specified in the authorization request. Accordingly, action based matching filters out P2 leaving policies P3, P5, and P8 as the applicable policies for authorizing the authorization request. Assuming that no further filtering is performed, policies P3, P5, and P8 emerge as applicable policies after processing performed in 710 in FIG. 7.

Policies P3, P5, and P8 are then evaluated to determine success (i.e., grant authorization) or failure (denial of authorization) of the authorization request, per 226 in FIG. 2 and described above. In some embodiments using a strict approach, each of policies P3, P5, and P8 has to evaluate to TRUE or success (authorization granted) for the authorization request to be authorized (i.e., for Joe to be allowed to view resource /A/C/D/F). Else, the authorization request may be denied (i.e., Joe is not allowed to view resource /A/C/D/F. In one embodiment, the evaluation of policies P3, P5, and P8 comprises evaluating the set of rules specified for P3, P 5, and P8. In one embodiment, each rule associated with a policy has to evaluate to TRUE (authorization granted) for the policy to be successfully (i.e., a grant result) evaluated. In another embodiment, a policy may evaluate to TRUE if any one of the rules associated with the policy evaluates to TRUE, etc.

Policies P3, P5, and P8 are then evaluated, per 226 in FIG. 2, to determine whether the authorization of the received authorization request is successful or not. Authorization system 102 may then respond to the authorization requester with the result of the authorization processing (per 228 in FIG. 2). If the authorization request is successfully authorized, then Joe is allowed to view hierarchical resource /A/C/D/F, else Joe is not allowed to view hierarchical resource /A/C/D/F.

As described above, during runtime processing of an authorization request specifying a hierarchical resource, the one or more path components in the resource expression in the authorization request are extracted and compared to nodes in the sparse trees constructed for hierarchical resources to see if there is a match. For example, the memory structures (e.g., sparse trees) built for each expression type (e.g., exact, prefix, postfix, contains, etc.) are searched based upon the path components in the authorization request to find matches, if any. This matching is then used to identify policies that are applicable for authorizing the authorization request. Accordingly, the amount of processing performed during runtime to identify applicable policies for an authorization request is a function of the number of path components in the authorization request resource expression. For example, for a particular expression type, the number of comparisons performed during the matching process to find applicable policies depends upon the number of path components in the authorization request resource expression and is independent of both the number of policies configured for the enterprise system and also the number of resources in the enterprise system. Since the number of path components in an authorization request resource expression is typically far less (generally several orders of magnitude less) than the number of policies configured for the enterprise system or the number of resources in the enterprise system, this greatly reduces the amount of processing resources used and time needed for identifying one or more policies that are applicable to the authorization request than conventional techniques.

For example, the example authorization request discussed above has a resource expression of "A/C/D/F", which contains four path components. The processing needed for determining applicable policies for the authorization request is thus a function of the four path components and does not depend upon the number of policies configured for the enterprise system or the number of resources. In many instances, the number of comparisons that are performed when searching the sparse trees built for a particular expression type is at most (i.e., an upper ceiling) the number of path components in the resource expression of an authorization request. For example, when resource expression "A/C/D/F" is being compared to tree 900 in FIG. 9B, tree 100 in FIG. 10B, or trees 1100 and 1120 in FIG. 11B, the maximum number of comparisons needed for memory structures for a particular expression type to determine the applicable policies for that expression type is at most four. Advantageously, the processing to determine applicable policies is not dependent upon the number of policies or the number of resources in the enterprise system.

Non-Hierarchical Resources

Non-hierarchical resources are not part of any hierarchy. Accordingly, the resource expressions for non-hierarchical resources do not comprise any path components. A resource expression identified a non-hierarchical resource using one or more characters, which may include zero or more regular expression characters. For example, for a non-hierarchical resource named "abcde", examples of resource expressions that may be used include:
"abcde"—Exact expression
"abc.*"—Prefix expression (or "starts with" expression)
".*de"—Postfix expression (or "ends with" expression)
".*bc.*"—Contains expression
etc.—Other customized expressions
Accordingly, the components of a regular expression are characters.

For purposes of illustrating processing performed for non-hierarchical resources, it is assumed that the following policies are defined for an enterprise system as related to non-hierarchical resources:
P1: (<Subject=Greg; Resource=(Non-Hierarchical, "abcd"), Action=View>, <Rules>)
P12: (<Subject=Joe; Resource=(Non-Hierarchical, "a.*"), Action=Edit>, <Rules>)
P13: (<Subject=Joe; Resource=(Non-Hierarchical, "ab.*"), Action=View>, <Rules>)
P14: (<Subject=Joe; Resource=(Non-Hierarchical, "bc.*"), Action=View>, <Rules>)
P15: (<Subject=Joe; Resource=(Non-Hierarchical, ".*yz"), Action=View>, <Rules>)
P16: (<Subject=Joe; Resource=(Non-Hierarchical, ".*xz"), Action=View>, <Rules>)
P17: (<Subject=Joe; Resource=(Non-Hierarchical, ".*bd.*"), Action=View>, <Rules>)
P18: (<Subject=Joe; Resource=(Non-Hierarchical, ".*bc.*"), Action=View>, <Rules>)

Initialization Phase Processing (for Non-hierarchical Resources)

During initialization phase, per step 212 in FIG. 2, the policies configured for an enterprise system are scanned and target information for the policies identified. Memory structures are then constructed for the policies per step 214 in FIG. 2. Each individual policy may be processed according to flowchart 300 depicted in FIG. 3. Accordingly, policies P1 to P18 are scanned and memory structures built for the policies. In one embodiment, the policies are scanned and processed in sequential order, for example, policy P1 will be processed first, followed by policy P1, followed by policy P1, and so on. For each policy, a resource type, a resource expression, and the expression type for the resource expression are determined and used to build the memory structures.

(1) Exact Expression Type (Initialization Phase Processing)

Authorization system 102 will determine that the resource expression for policy P11 is of the exact expression type.
P11: (<Subject=Greg; Resource=(Non-Hierarchical, "abcd"), Action=View>, <Rules>)
In one embodiment, an exact expression type resource expression for a non-hierarchical resource specifies the full resource name.

Figure 13:
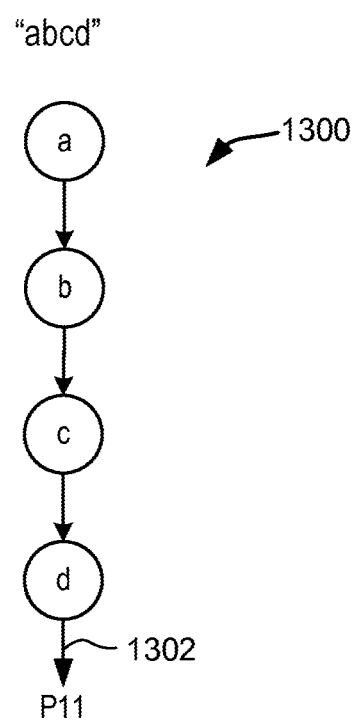
FIGS. 13, 14A, 14B, 14C, 15A, 15B, 16A, and 16B depict examples of memory structures that may be constructed for various expression types for non-hierarchical resources according to an embodiment of the present invention.

A sparse tree 1300 is constructed for P11 as depicted in FIG. 13. The resource expression is processed to extract the character components, which are then processed from left to right as they appear in the resource expression. Sparse tree 1300 is built based upon the character components, starting from the left-most component ("a") to the right-most component ("e"). Sparse tree 1300 has four nodes corresponding to character components "a", "b", "c" and "d" identified in the resource expression for P11. In tree 1300, the nodes corresponding to the path components are hierarchically arranged in such a way so as to preserve and represent the order and relative positions of the characters in P11's resource expression. For example, the left-most character "a" represents the root of the tree, a node corresponding to the next character "b" is made a child of the root node, a node corresponding to the next character "c" is made a child of the node representing "b", and so on. In this manner, the position and order of the characters in the resource expression for a non-hierarchical resource are represented by the hierarchical relationships between the nodes in the sparse tree. A reference 1302 is stored from leaf node "d" to policy P11.

Sparse tree 1300 depicted in FIG. 13 represents the memory structure built for policy P11. Since this is the only exact expression type policy in P11-P1, sparse tree 1300 in FIG. 13 represents the memory structure built for the exact expression type for non-hierarchical resources.

(2) Prefix Expression Type (Initialization Phase Processing)

Authorization system 102 will determine that the resource expressions for policies P12, P13, and P14 are of the prefix expression type.
P12: (<Subject=Joe; Resource=(Non-Hierarchical, "a.*"), Action=Edit>, <Rules>)
P13: (<Subject=Joe; Resource=(Non-Hierarchical, "ab.*"), Action=View>, <Rules>)
P14: (<Subject=Joe; Resource=(Non-Hierarchical, "bc.*"), Action=View>, <Rules>)
In one embodiment, a prefix expression type resource expression for a non-hierarchical resource specifies the start of the non-hierarchical resource name but ends in a regular expression character.

Figure 14A:
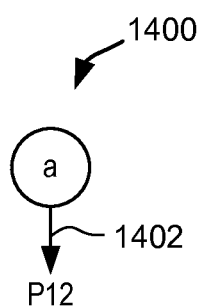

A sparse tree 1400 is constructed for P12 as depicted in FIG. 14A. The resource expression is processed to extract the character components, which are then processed from left to right as they appear in the resource expression. For P12, the resource expression comprises a single "a". Sparse tree 1400 is built based upon the character component and has a single node corresponding to character "a" extracted from the resource expression for P12. A reference 1402 is stored from leaf node "a" to policy P12.

Figure 14B:
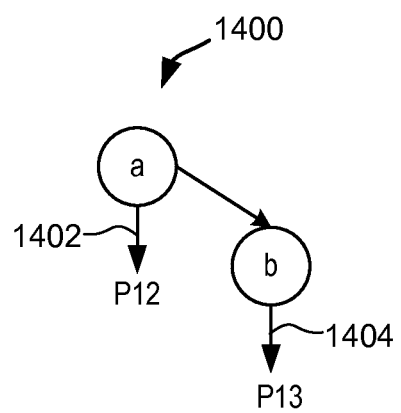

Policy P13 is processed next and character components "a" and "b" extracted from the resource expression for P13. The characters are processed in a left to right manner based upon their position in the resource expression starting with character "a". Since the starting character "a" is the same as the starting character for the resource expression in P12, tree 1400 is augmented to store information for P13. Accordingly, as depicted in FIG. 14B, sparse tree 1400 is augmented by adding a node corresponding to character component "b". The node for "b" is made the child of the node for "a" so as to preserve the order in which the characters appear in the resource expression for P13. Again, the order and the relative positions of the characters in the resource expression for a non-hierarchical resource are represented by the hierarchical relationships between the nodes in the sparse tree. A reference 1404 is stored from the leaf node representing "b" to information identifying policy P13.

Figure 14C:
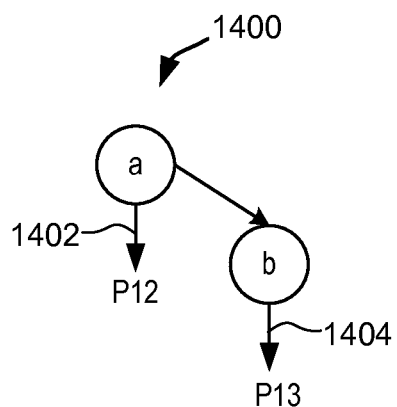
Figure 14C:
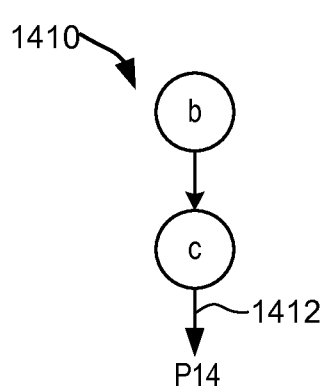

Policy P14 is processed next and character components "b" and "c" extracted from the resource expression for P14. The characters are again processed in a left to right manner based upon their position in the resource expression starting with character "b". Since "b" does not match the root node of tree 1400, a new sparse tree is built representing P14. Accordingly, as depicted in FIG. 14C, a sparse tree 1410 is created comprising two nodes "b" and "c". The node for "c" is made the child of the node for "b" so as to preserve the order in which the characters appear in the resource expression for P14. A reference 1412 is stored from the leaf node representing "c" to information identifying policy P14.

Sparse trees 1400 and 1410 depicted in FIG. 14C represent the memory structures built for policies P12, P13, and P14. Since these are the only prefix expression type policies in P11-P18 for non-hierarchical resources, sparse trees 1400 and 1410 in FIG. 14C represent the memory structures built for the prefix expression type for non-hierarchical resources.

In one embodiment, to simplify and optimize sparse tree construction, the prefix type resource expressions for non-hierarchical resources may be sorted based upon the number of characters specified in the resource expressions. Sparse tree construction may then be performed in order starting with the resource expression in the sorted list with the highest number of characters. For example, in the above example, after the sorting, resource expressions for P13 and P14 would rank higher in the sorted list than P12 and as a result the sparse trees for P13 and/or P14 would be constructed before constructing the sparse tree for P12. Sorting and then performing sparse tree constructions enables sparse tree construction to be performed efficiently, especially where one or more characters are common to multiple resource expressions. Building sparse trees in this manner ensures that processing for a shorter resource expression does not have to reposition the top side node to become a subtree of a longer resource expression.

(3) Postfix Expression Type (Initialization Phase Processing)

Authorization system 102 will determine that the resource expressions for policies P15 and P16 are of the postfix expression type.

P15: (<Subject=Joe; Resource=(Non-Hierarchical, ".*yz"), Action=View>, <Rules>)
P16: (<Subject=Joe; Resource=(Non-Hierarchical, ".*xz"), Action=View>, <Rules>)

In one embodiment, a postfix expression type resource expression for a non-hierarchical resource specifies the ending one or more characters but starts with one or more regular expression characters.

Figure 15A:
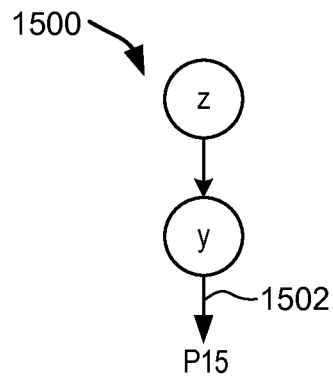

Assuming that P15 is processed before P16, a sparse tree 1500 is constructed for P15 as depicted in FIG. 15A. The resource expression for P15 is processed to extract the character components, which are then processed from right (starting with "z" for P15) to left as they appear in the resource expression to build the sparse tree. Alternatively, the resource expression is first reversed and the path components extracted from the reversed resource expression can then be processed in a left-most ("z" for P15) to right-most manner. Sparse tree 1500 depicted in FIG. 15A is built based upon the character components. Sparse tree 1500 has two nodes corresponding to character components "z" and "y". In tree 1500 in FIG. 15A, the nodes corresponding to the character components preserve the positions of the characters in P15's resource expression in a reverse manner. The order and the relative positions of the characters in the resource expression for a non-hierarchical resource are thus represented by the hierarchical relationships between the nodes in the sparse tree. A reference 1502 is stored from the node representing "y" to information identifying policy P15.

Figure 15B:
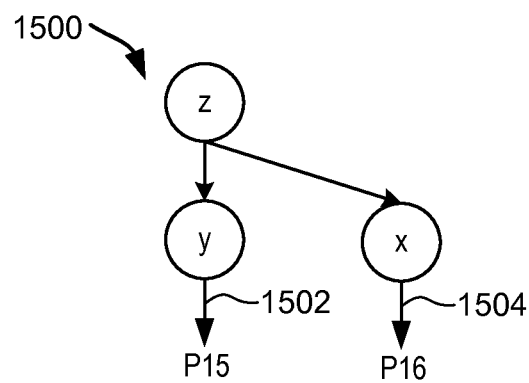

When policy P16 is processed, the resource expression may first be reversed and then character components extracted from the reversed resource expression then processed in a left-to-right manner. For example, for P16, processing for character "z" is processed first followed by processing for character "x". Since "z" matches the root node of tree 1500, sparse tree 1500 may be augmented to represent the resource expression for P16. Accordingly, as depicted in FIG. 15B, a node corresponding to "x" is added to sparse tree 1500. The new node "x" is made a child of node "z" so as to preserve the order in which the characters appear in the resource expression for P16l in a reversed manner. A reference 1504 is stored from the leaf node representing "x" to information identifying policy P16.

Sparse tree 1500 depicted in FIG. 15B represents the memory structure built for policies P15 and P16. Since these are the only prefix expression type policies in P11-P18 for non-hierarchical resources, sparse tree 1500 in FIG. 15B represents the memory structure built for the postfix expression type for non-hierarchical resources.

In one embodiment, to simplify and optimize sparse tree construction, the postfix type resource expressions for non-hierarchical resources may be sorted based upon the number of characters specified in the resource expressions. Sparse tree construction may then be performed in order starting with the resource expression in the sorted list with the highest number of characters. Sorting and then performing sparse tree construction enables sparse tree construction to be performed efficiently, especially where one or more character components are common to multiple resource expressions. Building sparse trees in this manner ensures that processing for a shorter resource expression does not have to reposition the top side node to become a subtree of a longer resource expression.

(4) Contains Expression Type (Initialization Phase Processing)

Authorization system 102 will determine that the resource expressions for policies P17 and P18 are of the contains expression type.

P17: (<Subject=Joe; Resource=(Non-Hierarchical, ".*bd.*"), Action=View>, <Rules>)
P18: (<Subject=Joe; Resource=(Non-Hierarchical, ".*bc.*"), Action=View>, <Rules>)

In one embodiment, a contains expression type resource expression for a non-hierarchical resource specifies one or more characters in the middle and has one or more regular expression characters at the start and end of resource expression.

Figure 16A:
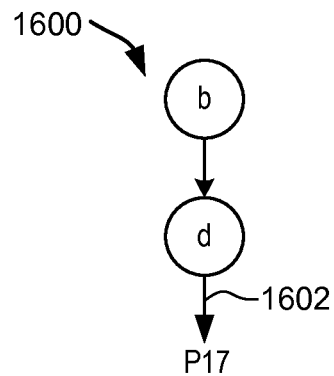

A sparse tree 1600 is constructed for P17 as depicted in FIG. 16A. The resource expression is processed to extract character components "b" and "d", which are then processed from left to right as they appear in the resource expression. Sparse tree 1400 is built based upon the character components and has two nodes corresponding to characters "b" and "d" extracted from the resource expression for P17. The node for "d" is made the child of the node for "b" so as to preserve the order in which the characters appear in the resource expression for P17. The order and the relative positions of the characters in the resource expression for a non-hierarchical resource are thus represented by the hierarchical relationships between the nodes in the sparse tree. A reference 1602 is stored from leaf node "d" to policy P17.

Figure 16B:
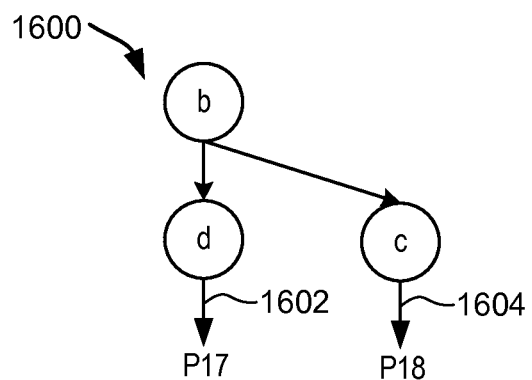

Policy P18 is processed next and character components "b" and "c" extracted from the resource expression. The characters are processed in a left to right manner based upon their position in the resource expression starting with character "b". Since the starting character "b" matches the node of tree 1600 (i.e., the starting character for the resource expression in P17), tree 1600 is augmented to store information for P18. Accordingly, as depicted in FIG. 16B, sparse tree 1600 is augmented by adding a node corresponding to character component "c". The node for "c" is made the child of the node for "b" so as to preserve the order in which the characters appear in the resource expression for P18. A reference 1604 is stored from the leaf node representing "c" to information identifying policy P18.

Sparse tree 1600 depicted in FIG. 16B represents the memory structure built for policies P17 and P18. Since these are the only contains expression type policies in P11-P18 for non-hierarchical resources, sparse tree 1600 in FIG. 16B represents the memory structure built for the prefix expression type for non-hierarchical resources.

(5) Custom Expression Type (Initialization Phase Processing)

In some instances, a resource expression may not be classified as either an exact, prefix, postfix, or contains type. Such a resource expression may be classified as custom type. Customized memory structures may be constructed to enable processing of custom expression types.

For example, a resource expression associated with a policy may articulate the resource(s) to which the policy applies using other forms (i.e., those that do not fall into the exact, prefix, postfix, and contains categories). For example, a resource expression may be expressed as a regular expression that does not fall into any of the above-described expression types. Customized sparse trees may be constructed for these resource expressions. In some embodiments, a sequential matching of policy resource expressions may be performed to match a resource identified in an authorization request to a policy. Upon finding a match, resource expression to matching policies may be cached to avoid repetitive sequential match operations.

An example of a customized expression type is a resource expression such as:
P19: (<Subject=Joe; Resource=(Non-Hierarchical, "ab.*yz"), Action=View>, <Rules>)

In one embodiment, two separate sparse trees may be constructed for this resource expression: (1) corresponding to "ab.*"; and (2) corresponding to ".*yz".

The sparse tree for "ab.*" is built in a manner similar to sparse trees for prefix expression types for non-hierarchical resources, as described above. A reference may be stored from the node for "b" in this sparse tree to information identifying policy P19. The sparse tree for ".*yz" is built in a manner similar to sparse trees for postfix expression types for non-hierarchical resources, as described above. A reference may be stored from the node for "y" in this sparse tree to information identifying policy P19. In one embodiment, the sparse trees built for the prefix and postfix expression types for non-hierarchical resources may be augmented to store information for P19. For the references to P19 in the prefix and postfix trees, a flag may additionally be associated with each reference to indicate that this policy is to be selected as an applicable policy only if additional condition(s) is met; the condition in this case being that the same policy P19 is selected from matching in both the sparse trees (i.e., the prefix and postfix trees) for P19 to be selected as an applicable policy.

As shown above using the various examples, for policies targeting non-hierarchical resources, memory structures are constructed based upon the resource expressions specified by the policies. In one embodiment, the memory structures comprise sparse trees comprising one or more nodes. For non-hierarchical resources, each node in the sparse tree represents a character component identified in the resource expression. One or more sparse trees may be constructed for each expression type. For a sparse tree storing information for a resource expression corresponding to a policy, the sparse tree also stores a reference to the policy such that the policy can be identified or accessed from the sparse tree. A sparse tree may store information for one or more policies and accordingly store references to those policies.

In the examples described above for hierarchical and non-hierarchical resources, the memory structures are built based upon the resource expressions specified by the policies configured for an enterprise system. In some embodiments, a separate database may be provided that stores modeling information for the resources. For example, the database may store resource hierarchy information for hierarchical resources. In such an embodiment, the building of sparse tree may be simplified by using this modeling information instead of from the resource expressions. The policies may then be scanned and references to policies added to these sparse trees.

Authorization Request Processing Phase (for Non-hierarchical Resources)

The memory structures built during the initialization phase (or updated during the update phase) are then used by authorization system 102 for runtime processing of authorization requests received by authorization system 102. As part of this processing, upon receiving an authorization request, authorization system 102 uses the constructed memory structures to identify a set of policies that are applicable for the received authorization request, as described above with respect to 224 in FIGS. 2 and 708 in FIG. 7.

The following section describes an example to illustrate processing performed in response to receiving an authorization request specifying a non-hierarchical resource. The example below assumes that memory structures for policies targeting non-hierarchical resources have been constructed as depicted in FIGS. 13, 14C, 15B, and 16B. Further, the example assumes that the following authorization request is received.

Authorization Request: (Subject=Joe; Resource(Non-Hierarchical, "zabdxz"), Action=View)

As indicated by the example authorization request, Joe is requesting a view action on non-hierarchical resource "zabdxz".

Upon receiving this request, authorization system 102 determines the subject, resource, action information, and other information, if any, specified by the authorization request (as described above with respect to 702 in FIG. 7). Authorization system 102 then determines, as per 704 in FIG. 7, a resource type specified by the authorization. For this example, the resource type is non-hierarchical. Authorization system 102 then accesses the memory structures constructed for non-hierarchical resources. For sake of this example, it is assumed that these memory structures comprise the sparse trees depicted in FIGS. 13, 14C, 15B, and 16B. Per 708 in FIG. 7, the memory structures are then searched based upon information contained in the authorization request to identify policies that are applicable for the received authorization request based upon resources information. As part of the processing performed in 708, the memory structures corresponding to each of the different expression types are searched to find matches. This matching can be illustrated using the following examples.

(1) Exact Expression Type Matching for Non-hierarchical Resources

Sparse tree 1300 depicted in FIG. 13 represents the memory structures constructed for exact expression type for non-hierarchical resources. In one embodiment, the matching for this expression type is performed by extracting the character components from the resource expression specified by the authorization request and matching these to the nodes in sparse tree 1300. In one embodiment, the character matching is performed from the left-most character in the authorization request resource expression to the right and walking sparse tree 1300 starting from the root node. In this manner, the authorization request resource expression is processed from left to right and sparse tree 1300 is walked from top to bottom to see if there is a match.

For the example authorization request, character "z" is considered first and is matched to the top node "a" in sparse tree 1300. Since there is no match, no further matching is performed. Accordingly, no policies are identified as applicable for the example authorization request based upon exact type cache for non-hierarchical resources.

(2) Prefix Expression Type Matching for Non-hierarchical Resources

Sparse trees 1400 and 1410 depicted in FIG. 14C represent the memory structures constructed for prefix expression type for non-hierarchical resources. In one embodiment, the matching for this expression type is performed by extracting the character components from the resource expression specified by the authorization request and matching these to the nodes in sparse trees 1400 and 1410. In one embodiment, the character matching is performed from the left-most character in the authorization request resource expression to the right and walking sparse trees 1400 and 1410 from top to bottom. In this manner, the authorization request resource expression is processed from left to right and sparse trees 1400 and 1410 are walked from the root node towards a leaf node to see if there is a match.

For the example authorization request, character "z" is considered first and is found to not match either root node "a" in tree 1400 or root node "b" in tree 1410. Accordingly, no policies are identified as applicable for the example authorization request based upon prefix type cache for non-hierarchical resources.

(3) Postfix Expression Type Matching for Non-hierarchical Resources

Sparse tree 1500 depicted in FIG. 15B represents memory structures constructed for postfix expression type for non-hierarchical resources. In one embodiment, the matching for this expression type is performed by extracting the characters from the resource expression specified by the authorization request and matching these to the nodes in sparse tree 1500. In one embodiment, the resource expression in the authorization request is first reversed (e.g., "zabdxz" becomes "zxdbaz") and then the character components extracted path. Character matching is performed from the left-most path component moving to the right and walking sparse tree 1500. In this manner, the authorization request resource expression is reversed and processed from left to right and sparse tree 1500 is walked to see if there is a match.

For the example authorization request, character "z" is considered first and it is determined to match node "z" in sparse tree 1500. Next, character "x" (from reversed resource expression) is considered and is matched to the node "x" in sparse tree 1500, which is the child of the node "z". Since "x" is the last node in tree 1500 matching ends. Accordingly, nodes "z" and "x" in tree 1500 are walked during the matching process. All policies referenced by these walked nodes in sparse tree 1500 are then identified as policies that are applicable to the authorization request. For example, in tree 1500, node "x" has a reference 1504 to policy P16. Accordingly, policy P16 is identified as an applicable policy for the example authorization request. Accordingly, a search of the postfix type cache for non-hierarchical resources (per 708 in FIG. 7) yields P16 as an applicable policy for authorizing the authorization request.

(4) Contains Expression Type Matching for Non-hierarchical Resources

Sparse tree 1600 depicted in FIG. 16B represents memory structures constructed for contains expression type for non-hierarchical resources. In one embodiment, the matching for this expression type is performed by extracting the characters from the resource expression specified by the authorization request and matching these to the nodes in sparse tree 1600. In one embodiment, the character matching is performed from the left-most character in the authorization request resource expression to the right and walking sparse tree 1600 starting from the root node. In this manner, the authorization request resource expression is processed from left to right and sparse tree 1600 is walked from a root node towards a leaf node to see if there is a match. For this expression type, each of the characters in the resource expression is processed to identify matches.

For the example authorization request, character "z" is considered first to see if it is a match to the root node of tree 1600. No match is found. Next, character "a" is considered and again no match is found to node "b" in sparse tree 1600. Next, character "b" is considered and is matched to node "b" in tree 1600. Next, character "d" is considered and found to match node "d", which is a child of node "b", in tree 1600. Since "d" is the last node in tree 1600, the matching based upon character "b" in the resource expression ends. Policies associated with the walked nodes are identified as applicable policies for authorizing the authorization request. In this case, in tree 1600, nodes "b" and "d" are walked and node "d" has a reference 1602 to policy P17, which is identified as an applicable policy.

Next, character "d", which follows character "b" in the resource expression in the authorization request, is considered and not matched to root node "b" in tree 1600. Next, character "x", which follows character "d" in the resource expression in the authorization request, is considered and not matched to root node "b" in tree 1600. Next, character "z", which follows character "x" in the resource expression in the authorization request, is considered and not matched to root node "b" in tree 1600. Since all the characters in the resource expression specified by the authorization request have been processed, the matching processing ends.

Accordingly, a search of the contains type cache for non-hierarchical resources (per 708 in FIG. 7) yields P17 as an applicable policy for authorizing the authorization request.

(5) Custom Expression Type Matching for Hierarchical Resources

Sparse trees or other data structures stored for custom expressions types may be used to find matches, if any, based upon the resource expression in the received authorization request.

In the above example for an authorization request identifying a non-hierarchical resource, based upon matching performed between the resource expression in the authorization request and the memory structures for exact, prefix, postfix, contains and custom expression types, policies P16 and P17 are identified as applicable policies for authorizing the received authorization request. These policies are then further filtered based upon the subject, action, and other information in the authorization request per 710 in FIG. 7. From matching the subject, it is determined that both P16 and P17 are related to subject "Joe", which is a match to subject "Joe" specified in the authorization request. Accordingly, both policies pass the subject based match filtering. Next, from matching the action, it is determined that both policies P16 and P17 apply to action "View" and match action "View" specified in the authorization request. Accordingly, both policies also pass the action based match filtering. Assuming that no further filtering is performed, policies P16 and P17 emerge as applicable policies after processing performed in 710 in FIG. 7.

Policies P16 and P17 are then evaluated to determine success (i.e., grant authorization) or failure (denial of authorization) of the authorization request, per 226 in FIG. 2 and described above. In some embodiments using a strict approach, both the policies have to evaluate to TRUE or success (authorization granted) for the authorization request to be authorized (i.e., for Joe to be allowed to view resource "zabdxz"). Else, the authorization request may be denied (i.e., Joe is not allowed to view resource "zabdxz". In one embodiment, the evaluation of policies P16 and P17 comprises evaluating the set of rules specified for P16 and P17. In one embodiment, each rule associated with a policy has to evaluate to TRUE (authorization granted) for the policy to be successfully (i.e., a grant result) evaluated. In another embodiment, a policy may evaluate to TRUE if any one of the rules associated with the policy evaluates to TRUE, etc.

Policies P16 and P17 are then evaluated, per 226 in FIG. 2, to determine whether the authorization of the received authorization request is successful or not. Authorization system 102 may then respond to the authorization requester with the result of the authorization processing (per 228 in FIG. 2). If the authorization request is successfully authorized, then Joe is allowed to view non-hierarchical resource "zabdxz", else Joe is not allowed to view non-hierarchical resource "zabdxz".

As described above, during runtime processing of an authorization request specifying a non-hierarchical resource, the one or more characters in the resource expression in the authorization request are extracted and compared to nodes in the sparse trees constructed for non-hierarchical resources to see if there is a match. For example, the memory structures (e.g., sparse trees) built for each expression type (e.g., exact, prefix, postfix, contains, etc.) are searched based upon the extracted characters to find matches, if any. This matching is then used to identify policies that are applicable for authorizing the authorization request. Accordingly, the amount of processing performed during runtime to identify applicable policies for an authorization request is a function of the number of characters in the authorization request resource expression. For example, for a particular expression type, the number of comparisons performed during the matching process to find applicable policies depends upon the number of characters in the authorization request resource expression and is independent of both the number of policies configured for the enterprise system and also the number of resources in the enterprise system. Since the number of characters in an authorization request resource expression (i.e., in the resource name for non-hierarchical resources) is typically far less (generally several orders of magnitude less) than the number of policies configured for the enterprise system or the number of resources in the enterprise system, this greatly reduces the amount of processing resources used and time needed for identifying one or more policies that are applicable to the authorization request than conventional techniques.

For example, the example authorization request discussed above has a resource expression of "zabdxz", which contains six characters. The processing needed for determining applicable policies for the authorization request is thus a function of the six characters and does not depend upon the number of policies configured for the enterprise system or the number of resources. In many instances, the number of comparisons that are performed when searching the sparse trees built for a particular expression type is at most (i.e., has an upper ceiling) the number of characters in the resource expression of an authorization request. For example, when resource expression "zabdxz" is being compared to the trees in FIG. 13, 14C, or 15B, the maximum number of comparisons needed for memory structures for a particular expression type to determine the applicable policies for that expression type is at most six. Advantageously, the processing to determine applicable policies is not dependent upon the number of policies or the number of resources in the enterprise system.

While the examples described above use sparse trees to represent information related to policies configured for an enterprise system, this is not intended to be limiting. In some other embodiments, various other data structures may also be used. For example, the trees may be represented using linked lists, arrays, etc.

Certain embodiments of the present invention thus optimize the authentication decision evaluation process to identify applicable security policies and evaluate them to compute the authorization request authorization decision. The number of policies that need to be evaluated to compute the authorization decision is also reduced. The authorization decision evaluation time is thus reduced by eliminating the need to evaluate a large number of non-applicable policies. This improves the system throughput of the authorization system by optimizing system utilization and reducing authorization decision evaluation latency. This reduces the use of system resources such as CPU(s) and memory utilization, which in turn allows more system throughput for authorization evaluation.

Figure 17:
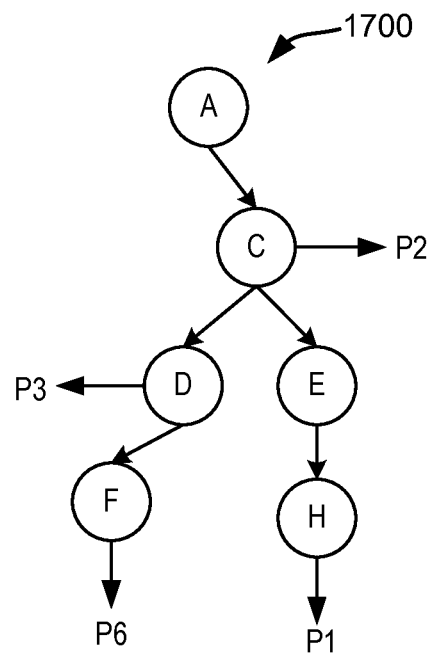
FIG. 17 shows an example of a memory structure storing information representing policies of more than one expression type for a resource type according to an embodiment of the present invention.

In the hierarchical and non-hierarchical examples described above, separate data structures are built for the different expression types for each resource type. In some embodiments, the data structures built for two or more expression types for a resource type may be combined into a single data structure. Further, in some embodiments, common data structures may be built for multiple expression types for a resource type. For example, in one embodiment, common data structures may be built for the exact and prefix expression types. For example, as previously described, FIG. 9B shows examples of data structures built for exact expression type for hierarchical resources for resource expressions "/A/C/E/H" and "/A/C/D/F" and FIG. 10B shows examples of data structures built for prefix expression type for hierarchical resources for resource expressions "/A/C/.*" and "/A/C/D/.*". In one embodiment, a common data structure 1700 may be built as shown in FIG. 17 for representing all four resource expressions "/A/C/E/H", "/A/C/D/F", "/A/C/.*", and "/A/C/D/.*". Such a memory structure further reduces the amount of memory needed for the memory structures and the number of comparisons that are performed for identifying policies that are applicable for an authorization request. Runtime processing of data structure 1700 can be performed as previously described. All the policies referenced by the nodes in sparse tree 1700 that are walked during the matching process are identified as policies that are applicable to the authorization request. Data structures for other type of expression types for a resource type may also be combined or common data structures built in alternative embodiments. In some embodiments, a common root may be used with the data structures corresponding to the different expression types for a resource type emanating from this common root.

Figure 18:
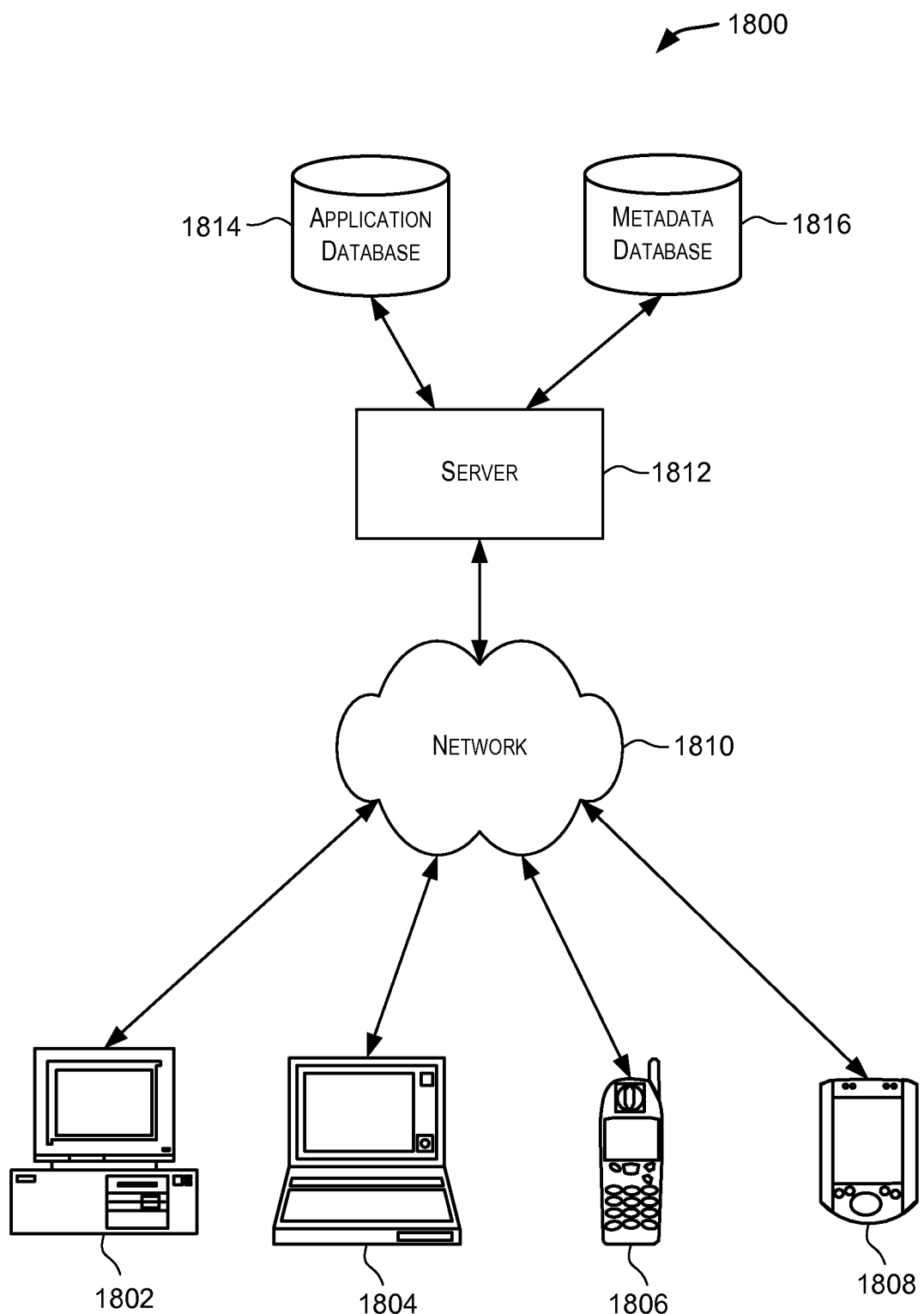
FIG. 18 is a simplified block diagram illustrating components of a system environment that may be used in accordance with an embodiment of the present invention.

FIG. 18 is a simplified block diagram illustrating components of a system environment 1800 that may be used in accordance with some embodiments of the present invention. As shown, system environment 1800 includes one or more client computing devices 1802, 1804, 1806, 1808, which are configured to operate a client application such as a web browser, proprietary client (e.g., Oracle Forms), or the like. In various embodiments, client computing devices 1802, 1804, 1806, and 1808 may interact with a server 1812.

Client computing devices 1802, 1804, 1806, 1808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1802, 1804, 1806, and 1808 may be any other electronic device, such as a thin-client computer, Internet-enabled gaming system, and/or personal messaging device, capable of communicating over a network (e.g., network 1810 described below). Although system environment 1800 is shown with four client computing devices, any number of client computing devices may be supported. Other devices such as devices with sensors, etc. may interact with server 1812. Authorization requests may be received from one or more client devices.

System environment 1800 may include a network 1810. Network 1810 may be any type of network familiar to those skilled in the art that can support data communications using any of a variety of commercially-available protocols, including without limitation TCP/IP, SNA, IPX, AppleTalk, and the like. Merely by way of example, network 1810 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1800 also includes one or more server computers 1812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to an authorization system as depicted in FIG. 1.

Server 1812 may run an operating system including any of those discussed above, as well as any commercially available server operating system. Server 1812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1800 may also include one or more databases 1814, 1816. Databases 1814, 1816 may reside in a variety of locations. By way of example, one or more of databases 1814, 1816 may reside on a storage medium local to (and/or resident in) server 1812. Alternatively, databases 1814, 1816 may be remote from server 1812, and in communication with server 1812 via a network-based or dedicated connection. In one set of embodiments, databases 1814, 1816 may reside in a storage-area network (SAN) familiar to those skilled in the art. Similarly, any necessary files for performing the functions attributed to server 1812 may be stored locally on server 1812 and/or remotely, as appropriate. In one set of embodiments, databases 1814, 1816 may include relational databases, such as Oracle 10g, 11g, Release 12, etc., which are adapted to store, update, and retrieve data in response to SQL-formatted and other commands. In one embodiment, policies configured to controlling a set of resources may be stored by one of the databases.

Figure 19:
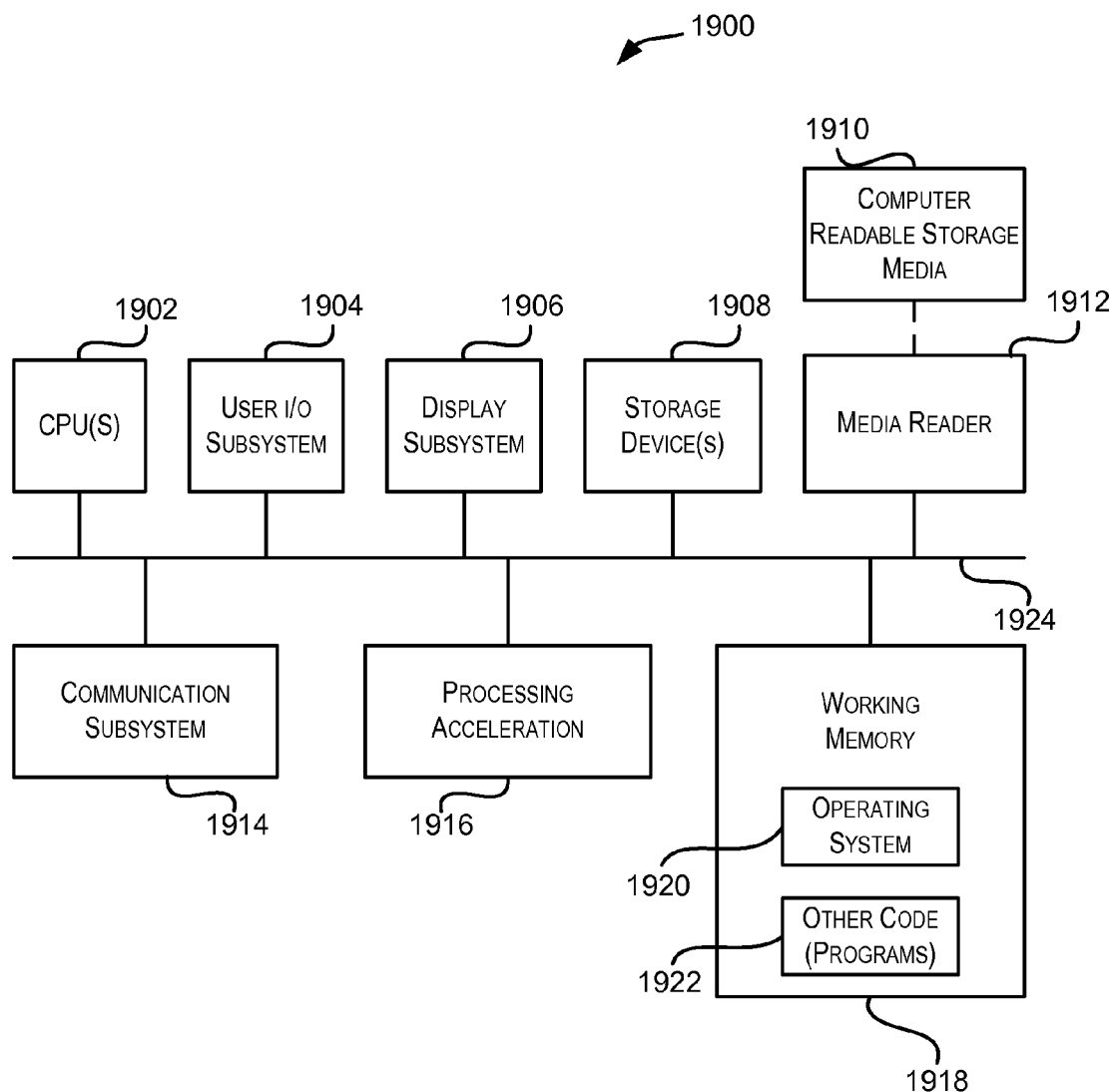
FIG. 19 is a simplified block diagram of a computer system that may be used in accordance with embodiments of the present invention.

FIG. 19 is a simplified block diagram of a computing system 1900 that may be used in accordance with embodiments of the present invention. For example, authorization system 102 depicted in FIG. 1 may be implemented using a system such as system 1900. Computer system 1900 is shown comprising hardware elements that may be electrically coupled via a bus 1924. The hardware elements may include one or more central processing units (CPUs) 1902, one or more input devices 1904 (e.g., a mouse, a keyboard, etc.), and one or more output devices 1906 (e.g., a display device, a printer, etc.). The CPUs may include single or multicore CPUs. Computer system 1900 may also include one or more storage devices 1908. By way of example, the storage device(s) 1908 may include devices such as disk drives, optical storage devices, and solid-state storage devices such as a random access memory (RAM) and/or a read-only memory (ROM), which can be programmable, flash-updateable and/or the like.

Computer system 1900 may additionally include a computer-readable storage media reader 1912, a communications subsystem 1914 (e.g., a modem, a network card (wireless or wired), an infra-red communication device, etc.), and working memory 1918, which may include RAM and ROM devices as described above. In some embodiments, computer system 1900 may also include a processing acceleration unit 1916, which can include a digital signal processor (DSP), a special-purpose processor, and/or the like.

Computer-readable storage media reader 1912 can further be connected to a computer-readable storage medium 1910, together (and, optionally, in combination with storage device(s) 1908) comprehensively representing remote, local, fixed, and/or removable storage devices plus storage media for temporarily and/or more permanently containing computer-readable information. Communications system 1914 may permit data to be exchanged with network 1810 and/or any other computer described above with respect to system environment 1800.

Computer system 1900 may also comprise software elements, shown as being currently located within working memory 1918, including an operating system 1920 and/or other code 1922, such as an application program (which may be a client application, Web browser, mid-tier application, RDBMS, etc.). In an exemplary embodiment, working memory 1918 may include executable code and associated data structures such as memory structures used for processing authorization requests described above. It should be appreciated that alternative embodiments of computer system 1900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method comprising:

storing, by a computing system, a plurality of memory structures for a plurality of policies configured for a set of resources, the plurality of memory structures comprising a first set of memory structures corresponding to a first resource type and a second set of memory structures corresponding to a second resource type, the first resource type including a hierarchical resource type and the second resource type including a non-hierarchical resource type, wherein the first set of memory structures includes at least a first memory structure corresponding to a first resource expression type and a second memory structure corresponding to a second resource expression type, and wherein the second set of memory structures includes at least a third memory structure corresponding to the first resource expression type and a fourth memory structure corresponding to the second resource expression type;

receiving, by the computing system, an authorization request comprising subject information identifying a subject, resource information, and action information identifying an action, the resource information comprising a resource expression identifying a resource and resource type information identifying a resource type, the resource expression comprising one or more components including one or more path components or one or more character components;

identifying, by the computing system, using the resource type information and the resource expression, a first set of policies from the plurality of policies to evaluate for authorizing the authorization request, a number of policies in the first set of policies being less than a number of policies in the plurality of policies, the identifying including:

determining, by the computing system, that the resource type identified in the authorization request is the first resource type;

selecting, by the computing system, the first set of memory structures from the plurality of memory structures based on the determination that the resource type is the first resource type, the first set of memory structures comprising a memory structure, the memory structure comprising one or more nodes corresponding to the one or more components included in the resource expression; and identifying, by the computing system, the first set of policies from the plurality of policies that are applicable for authorizing the authorization request, the identifying including matching the one or more components of the resource expression with the first memory structure and the second memory structure in the selected first set of memory structures, the first memory structure corresponding to the first resource expression type, and the second memory structure corresponding to the second resource expression type; and evaluating, by the computing system, one or more policies of the first set of policies to determine a success or a failure of the authorization request.

2. The method of claim 1 further comprising:

determining a second set of policies from the first set of policies based upon the subject and the action identified in the authorization request; and evaluating the second set of policies to determine whether the subject identified in the authorization request is authorized to perform the action identified in the authorization request on the resource identified in the authorization request.

3. The method of claim 1 wherein storing the plurality of memory structures comprises:
for a first policy in the plurality of policies:
determining a first resource expression specified by the first policy, the first resource expression identifying one or more resources from the plurality of resources to which the policy applies; and
constructing a first memory structure for the first policy based upon a resource type specified by the first policy and a resource expression type of the first resource expression.

4. The method of claim 3 wherein:
the resource type specified by the first policy is the first resource type;
the first resource expression is of the first resource expression type, the first resource expression comprising one or more components of a hierarchy of resources; and
constructing the first memory structure comprises:
creating the first memory structure comprising a first set of one or more nodes, each node corresponding to a component in the one or more components in the first resource expression; and
storing a first reference from at least one node in the first memory structure to the first policy.

5. The method of claim 4 wherein storing the plurality of memory structures comprises:
for a second policy in the plurality of policies:
determining a resource type specified by the second policy is the first resource type;
determining that a resource expression specified by the second policy is of the first resource expression type, the resource expression specified by the second policy comprising one or more components of the hierarchy of resources; and
adding at least one node to the first memory structure for the second resource expression; and
storing a second reference from the at least one node in the first memory structure to the second policy.

6. The method of claim 1 wherein:
the storing comprises:
storing the memory structure for a first policy from the plurality of policies, the first policy specifying a first resource expression of the first resource expression type; and
storing a second memory structure for a second policy from the plurality of policies, the second policy specifying a second resource expression of the second resource expression type; and
the identifying comprises searching both the memory structure and the second memory structure using the resource expression identified by the authorization request to identify the first set of policies.

7. The method of claim 6 wherein searching the memory structure comprises:
identifying a first path of the one or more nodes in the memory structure that match at least one of the one or more components of the resource expression specified by the authorization request; and
including all policies referenced by the one or more nodes in the first path in the first set of policies.

8. The method of claim 1 wherein a number of comparisons performed to identify the first set of policies depends upon a number of the one or more components specified by the resource expression in the authorization request and is independent of the set of resources and a number of policies in the plurality of policies.

9. A computer-readable storage memory storing a plurality of instructions executable by a computing system, the plurality of instructions comprising:
instructions that cause the computing system to store a plurality of memory structures, for a plurality of policies configured for a set of resources, the plurality of memory structures comprising a first set of memory structures corresponding to a first resource type and a second set of memory structures corresponding to a second resource type, the first resource type including a hierarchical resource type and the second resource type including a non-hierarchical resource type, wherein the first set of memory structures includes at least a first memory structure corresponding to a first resource expression type and a second memory structure corresponding to a second resource expression type, and wherein the second set of memory structures includes at least a third memory structure corresponding to the first resource expression type and a fourth memory structure corresponding to the second resource expression type;
instructions that cause the computing system to determine, for an authorization request, a subject specified by the authorization request, resource information specified by the authorization request, and action specified by the authorization request, the resource information comprising a resource expression and identifying a resource type, the resource expression comprising one or more components including one or more path components or one or more character components;
instructions that cause the computing system to identify, using the resource type information and the resource expression, a first set of policies from the plurality of policies to evaluate for authorizing the authorization request, a number of policies in the first set of policies being less than a number of policies in the plurality of policies, the instructions that cause the computing system to identify the plurality of policies to the first set of policies including:
instructions that cause the computing system to determine that the resource type identified in the authorization request is the first resource type;
instructions that cause the computing system to select the first set of memory structures from the plurality of memory structures based on the determination that the resource type is the first resource type, the first set of memory structures comprising a memory structure, the memory structure comprising one or more nodes corresponding to the one or more components included in the resource expression; and
instructions that cause the computing system to identify, the first set of policies from the plurality of policies that are applicable for authorizing the authorization request, the identifying including matching the one or more components of the resource expression with the first memory structure and the second memory structure in the selected first set of memory structures, the first memory structure corresponding to the first resource expression type, and the second memory structure corresponding to the second resource expression type; and
instructions that cause the computing system to evaluate one or more policies of the first set of policies to determine a success or a failure of the authorization request.

10. The computer-readable storage memory of claim 9 further comprising:
   instructions that cause the computing system to determine a second set of policies from the first set of policies based upon the subject and the action identified in the authorization request; and
   instructions that cause the computing system to evaluate the second set of policies to determine whether the subject identified in the authorization request is authorized to perform the action identified in the authorization request on the resource identified in the authorization request.

11. The computer-readable storage memory of claim 9 wherein the instructions that cause the computing system to store the plurality of memory structures comprise:
   for a first policy in the plurality of policies:
      instructions that cause the computing system to determine a first resource expression specified by the first policy, the first resource expression identifying one or more resources from the plurality of resources to which the policy applies; and
      instructions that cause the computing system to construct a first memory structure for the first policy based upon a resource type specified by the first policy and a resource expression type of the first resource expression.

12. The computer-readable storage memory of claim 11 wherein:
   the resource type specified by the first policy is the first resource type;
   the first resource expression is of the first resource expression type, the first resource expression comprising one or more components of a hierarchy of resources; and
   the instructions that cause the computing system to construct the first memory structure comprise:
      instructions that cause the computing system to create the first memory structure comprising a first set of one or more nodes, each node corresponding to a component in the one or more components in the first resource expression; and
      instructions that cause the computing system to store a first reference from at least one node in the first memory structure to the first policy.

13. The computer-readable storage memory of claim 12 wherein the instructions that cause the computing system to store the plurality of memory structures comprise:
   for a second policy in the plurality of policies:
      instructions that cause the computing system to determine a resource type specified by the second policy is the first resource type;
      instructions that cause the computing system to determine that a resource expression specified by the second policy is of the first resource expression type, the resource expression specified by the second policy comprising one or more components of the hierarchy of resources; and
      instructions that cause the computing system to add at least one node to the first memory structure for the second resource expression; and
      instructions that cause the computing system to store a second reference from the at least one node in the first memory structure to the second policy.

14. The computer-readable storage memory of claim 9 wherein:
   the instructions that cause the computing system to store comprise:
      instructions that cause the computing system to store the memory structure for a first policy from the plurality of policies, the first policy specifying a first resource expression of the first resource expression type; and
      instructions that cause the computing system to store a second memory structure for a second policy from the plurality of policies, the second policy specifying a second resource expression of the second resource expression type; and
   the instructions that cause the computing system to identify comprise instructions that cause the computing system to search both the memory structure and the second memory structure using the resource expression identified by the authorization request to identify the first set of policies.

15. The computer-readable storage memory of claim 14 wherein the instructions that cause the computing system to search the memory structure comprise:
   instructions that cause the computing system to identify a first path of the one or more nodes in the emory structure that match at least one of the one or more components of the resource expression specified by the authorization request; and
   instructions that cause the computing system to include all policies referenced by the one or more nodes in the first path in the first set of policies.

16. The computer-readable storage memory of claim 9 wherein a number of comparisons performed to identify the first set of policies depends upon a number of the one or more components specified by the resource expression in the authorization request and is independent of the set of resources and a number of policies in the plurality of policies.

17. A system comprising:
   a memory configured to store a plurality of memory structures for a plurality of policies configured for a set of resources, the plurality of memory structures comprising a first set of memory structures corresponding to a first resource type and a second set of memory structures corresponding to a second resource type, the first resource type including a hierarchical resource type and the second resource type including a non-hierarchical resource type, wherein the first set of memory structures includes at least a first memory structure corresponding to a first resource expression type and a second memory structure corresponding to a second resource expression type, and wherein the second set of memory structures includes at least a third memory structure corresponding to the first resource expression type and a fourth memory structure corresponding to the second resource expression type; and
   a set of one or more processors, wherein one or more processors from the set of processors are configured to:
      determine, from an authorization request, a subject, resource information, and an action, the resource information comprising a resource expression identifying a resource and resource type information identifying a resource type, the resource expression comprising one or more components including one or more path components or one or more character components;
      identify, using the resource type information and the resource expression, a first set of policies from the plurality of policies to evaluate for authorizing the authorization request, a number of policies in the first set of policies being less than a number of policies in the plurality of policies, the identifying including:

determining that the resource type identified in the authorization request is the first resource type;

selecting the first set of memory structures from the plurality of memory structures based on the determination that the resource type is the first resource type, the first set of memory structures comprising a memory structure, the memory structure comprising one or more nodes corresponding to the one or more components included in the resource expression; and identifying the first set of policies from the plurality of policies that are applicable for authorizing the authorization request, the identifying including matching the one or more components of the resource expression with the first memory structure and the second memory structure in the selected first set of memory structures, the first memory structure corresponding to the first resource expression type, and the second memory structure corresponding to the second resource expression type; and evaluate one or more policies of the first set of policies to determine a success or a failure of the authorization request.

18. The system of claim 17 wherein one or more processors from the set of processors are configured to:

determine a second set of policies from the first set of policies based upon the subject and the action identified in the authorization request; and evaluate the second set of policies to determine whether the subject identified in the authorization request is authorized to perform the action identified in the authorization request on the resource identified in the authorization request.

19. The system of claim 17 wherein one or more processors from the set of processors are configured to:

store the memory structure for a first policy from the plurality of policies, the first policy specifying a first resource expression of a first resource expression type;

storing a second memory structure for a second policy from the plurality of policies, the second policy specifying a second resource expression of a second resource expression typed different from the first resource expression type;

search both the memory structure and the second memory structure using the resource expression identified by the authorization request to identify the first set of policies;

identify a first path of the one or more nodes in the memory structure that match at least one of the one or more components of the resource expression specified by the authorization request; and include all policies referenced by the one or more nodes in the first path in the first set of policies.

20. The system of claim 17 wherein one or more processors from the set of processors are configured to identify the first set of policies by comparing the resource expression in the authorization request to the first set of memory structures, wherein a number of comparisons performed to identify the first set of policies depends upon a number of the one or more components specified by the resource expression in the authorization request and is independent of the set of resources and a number of policies in the plurality of policies.

* * * * *